(12) United States Patent
Sugawara et al.

(10) Patent No.: US 6,942,347 B2
(45) Date of Patent: Sep. 13, 2005

(54) COLOR COMBINING OPTICAL SYSTEM, IMAGE PROJECTION OPTICAL SYSTEM, AND PROJECTION TYPE IMAGE DISPLAY APPARATUS

(75) Inventors: Saburo Sugawara, Tochigi (JP); Atsushi Okuyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/923,569

(22) Filed: Aug. 7, 2001

(65) Prior Publication Data

US 2002/0057499 A1 May 16, 2002

(30) Foreign Application Priority Data

Aug. 7, 2000 (JP) ........................................ 2000-239211

(51) Int. Cl.[7] ........................ G03B 21/00; G03B 21/26; G03B 21/14; G03B 21/28; G02B 27/28
(52) U.S. Cl. ............................ 353/33; 353/34; 353/69; 353/81; 353/82; 353/84; 359/496; 359/634; 359/640; 359/831
(58) Field of Search .......................... 353/30–31, 33–34, 353/69, 81–82, 84, 122; 359/494–496, 634, 639–640, 831; 349/5, 7

(56) References Cited

U.S. PATENT DOCUMENTS

| | | | | |
|---|---|---|---|---|
| 4,857,997 A | * | 8/1989 | Fukami et al. ............... | 348/338 |
| 5,999,321 A | | 12/1999 | Bradley ....................... | 359/587 |
| 6,176,583 B1 | | 1/2001 | Sawai .......................... | 353/20 |
| 6,227,670 B1 | * | 5/2001 | Numazaki et al. ............. | 353/31 |
| 6,235,435 B1 | * | 5/2001 | Peng ............................. | 430/5 |
| 6,273,568 B1 | * | 8/2001 | Okuyama ..................... | 353/31 |
| 6,404,552 B1 | * | 6/2002 | Manabe ....................... | 359/487 |
| 6,456,447 B1 | * | 9/2002 | Sato ............................ | 359/834 |
| 6,590,714 B2 | * | 7/2003 | Sugawara ..................... | 359/634 |
| 6,601,957 B2 | * | 8/2003 | Sugawara ..................... | 353/31 |
| 6,623,123 B2 | * | 9/2003 | Eguchi et al. ................ | 353/30 |
| 2001/0055096 A1 | | 12/2001 | Kodama et al. .............. | 353/71 |
| 2002/0140905 A1 | | 10/2002 | Ouchi et al. ................. | 353/31 |

FOREIGN PATENT DOCUMENTS

| | | |
|---|---|---|
| JP | 06258506 A | 9/1994 |
| JP | 07-318883 | 12/1995 |
| JP | 09-211449 | 8/1997 |
| JP | 10104763 A | 4/1998 |
| JP | 10-104763 | 4/1998 |
| JP | 2000-193924 | 7/2000 |

OTHER PUBLICATIONS

Communication from the European Patent Office dated Sep. 27, 2004 for Appl. No. 01306697.2–2202.

* cited by examiner

*Primary Examiner*—Judy Nguyen
*Assistant Examiner*—Magda Cruz
(74) *Attorney, Agent, or Firm*—Morgan & Finnegan, L.L.P.

(57) ABSTRACT

A color combining optical system according to this invention aims at reducing the size of an optical system and suppressing the occurrence of color unevenness. According to this invention, there is provided a color combining optical system for combining color light reflected by a dichroic film and color light transmitted through the dichroic film. The optical thickness of the dichroic film increases or decreases from one end side to the other end side in the inclining direction of the dichroic film with respect to the incident optical axis of the color light reflected by the dichroic film.

24 Claims, 23 Drawing Sheets

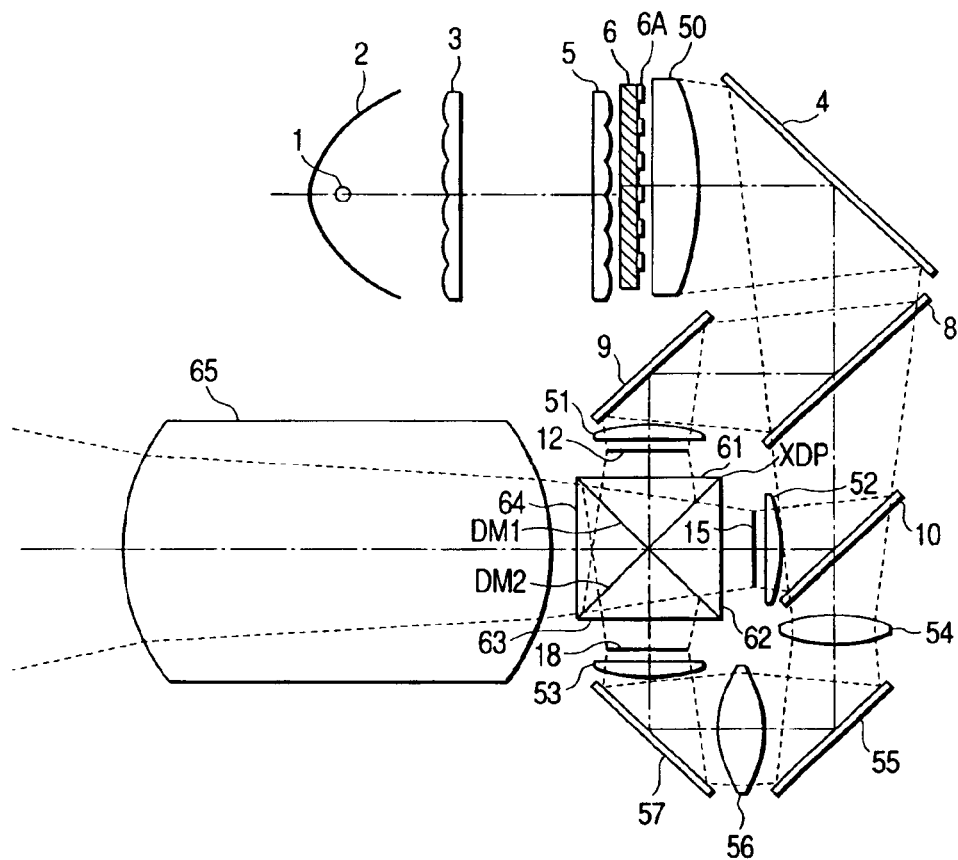
FIG. 25 - PRIOR ART -

COLOR COMBINING OPTICAL SYSTEM, IMAGE PROJECTION OPTICAL SYSTEM, AND PROJECTION TYPE IMAGE DISPLAY APPARATUS

BACKGROUND OF THE INVENTION

1. Field of the Invention

The present invention relates to a color combining optical system used for a projection type image display apparatus such as a liquid crystal projector.

2. Related Background Art

As shown in FIG. 25, as the color combining optical system of a liquid crystal projector, a cross-dichroic prism XDP comprised of four right-angle prisms 61, 62, 63, and 64, with dichroic layers DM1 and DM2 having different reflection wavelength regions being made to cross each other within each prism, is widely used.

In the cross-dichroic prism, if the four right-angle prisms are not accurately polished, the dichroic layers DM1 and DM2 are crimped at a vertex of the right-angle prism. As a consequence, a projection image on a screen (not shown) becomes a double image, resulting in a considerable decrease in resolution.

In addition, in order to keep a high resolution on the screen, the four right-angle prisms 61, 62, 63, and 64 must be joined to each other without causing any level difference between the joining surfaces. This requires close attention in joining operation.

Defects such as so-called flaws and cracks are not allowed on the right-angle ridge portions of the right-angle prisms. If a ridge portion is wide, a crossing portion of a cross-prism becomes a vertical streak and is projected on the screen.

As described above, a conventional cross-dichroic prism is difficult to process and join, resulting in difficulty in attaining a reduction in manufacturing cost.

To solve the above problem in a cross-dichroic prism, a technique of applying a color separation prism constituted by three prisms and used for a video camera or the like to a liquid crystal projector has been proposed in Japanese Patent Application Laid-Open No. 10-104763.

The prism shape of the color separation prism proposed in the above reference is not optimized to minimize the optical path length of the prism. For this reason, the prism requires a prism optical path length about twice that of a cross-dichroic prism. In addition, since there is no description about the material for the prism and its refractive index in the above reference, it is not clear whether the optical path length at the time of air conversion is decreased by increasing the refractive index of the prism.

According to the arrangement proposed in the above reference, since dichroic films do not cross each other in the prism, this prism can be easily manufactured as compared with a cross-dichroic prism. However, since the prism optical path is long, the back focus of a projection lens needs to be long as compared with a case wherein a cross-dichroic prism is used. As a consequence, the projection lens becomes large in size and high in cost. With regard to the performance of the projection lens, the chromatic aberration of magnification increases.

In some liquid crystal projectors, in order to attain a reduction in size of a color combining dichroic prism, i.e., a reduction in overall size of the projector, a lens group having a positive refractive power is arranged between the incident surface of the color combining dichroic prism and a liquid crystal image display element to focus a light beam passing through the liquid crystal image display element and incident on the color combining dichroic prism regardless of whether a cross-dichroic prism or a dichroic prism other than the cross-dichroic prism is used. This arrangement allows a reduction in effective aperture of the color combining dichroic prism on the exit side, thus attaining reductions in sizes of the color combining dichroic prism and projection lens.

If, however, a light beam in a wavelength region that makes the light beam be reflected by the dichroic film in the color combining dichroic prism upon incidence is converged by the lens group, since the dichroic film is inclined with respect to the incident optical axis of the light beam, the incident angle of the light beam with respect to the dichroic film varies depending on the incident position on the dichroic film.

In addition, the reflection characteristics of the dichroic film depend on the incident angle of reflected light. If, therefore, the incident angle of a light beam with respect to the dichroic film varies depending on the incident position, the color-combined (i.e., projected) image suffers brightness unevenness or color unevenness.

SUMMARY OF THE INVENTION

It is an object of the present invention to provide a color combining optical system which can attain a reduction in size and prevent a color-combined image from suffering brightness unevenness or color unevenness.

According to one aspect of the invention, there is provided a color combining optical system for combining color light reflected by a dichroic film and color light transmitted through the dichroic film, wherein an optical thickness of the dichroic film increases or decreases from one end side to the other end side in an inclining direction of the dichroic film with respect to an incident optical axis of the color light reflected by the dichroic film.

In further aspect of the above color combining optical system, a thickness of the dichroic film increases or decreases from one end side to the other end side in the inclining direction.

In further aspect of the above color combining optical system, a refractive index of the dichroic film increases or decreases from one end side to the other end side in the inclining direction.

In further aspect of the above color combining optical system, the optical thickness of the dichroic film increases as an incident angle of the reflected chromatic light on the dichroic film increases.

In further aspect of the above color combining optical system, the optical system comprises a color combining prism, and the dichroic film is formed at the inside of the color combining prism.

In further aspect of the above color combining optical system, the optical system further includes a positive refracting optical element which has a positive refractive power and causes the reflected color light to be incident on the color combining prism.

In further aspect of the above color combining optical system, the color combining prism is joined to the positive refracting optical system.

In further aspect of the above color combining optical system, the color combining prism and the positive refracting optical element are integrally formed.

In further aspect of the above color combining optical system, the color combining prism incorporates two dichroic films for reflecting different color light beams, and an optical thickness of at least one of the two dichroic films increases or decreases from one end side to the other end side in the inclining direction.

In further aspect of the above color combining optical system, the two dichroic films are formed so as not to cross each other within the color combining prism.

In further aspect of the above color combining optical system, the color combining prism comprises three prisms.

In further aspect of the above color combining optical system, the color combining prism comprises four prisms.

In further aspect of the above color combining optical system, two prisms are arranged between two dichroic films.

In further aspect of the above color combining optical system, the color combining prism includes a plurality of prisms, and a prism, of the plurality of prisms, which is located nearest to an exit side has at least three optically flat surfaces, and an exit surface also serves as a totally reflecting surface.

In further aspect of the above color combining optical system, the color combining prism sequentially includes, from an exit side, a first prism having at least three optically flat surfaces, with an exit surface also serving as a totally reflecting surface, a second prism having at least three optically smooth surfaces, and a third prism having at least two optically smooth surfaces, and two dichroic films which reflect different color light beams are arranged between the respective prisms so as not to cross each other.

In further aspect of the above color combining optical system, the color combining prism sequentially includes, from an exit side, a first prism having at least three optically flat surfaces, with an exit surface also serving as a totally reflecting surface, a second prism having at least two optically smooth surfaces, a third prism having at least three optically smooth surfaces, and a fourth prism having at least two optically smooth surfaces, two dichroic films which reflect different color light beams are arranged between the first and second prisms and between the third and fourth prisms so as not to cross each other.

In further aspect of the above color combining optical system, 0.07<L/f<0.35 is satisfied, where L is a diagonal length of an image display portion of the image modulation means, and f is a focal length of the positive refracting optical element.

In further aspect of the above color combining optical system, an angle θ1 defined by a surface of the color combining prism which is located on an exit side and on which a dichroic film is formed and an exit surface of the color combining prism satisfies $$20°<\theta1<35°$$

In further aspect of the above color combining optical system, an angle θ2 defined by an exit surface of the color combining prism and a surface of the color combining prism which is located on an incident side and on which a dichroic film is formed satisfies $$40°<\theta2<50°$$

In further aspect of the above color combining optical system, a focal length of at least one of the plurality of positive refracting optical elements is different from focal lengths of the remaining positive refracting optical elements.

According to another aspect of the invention, there is provided an image projection optical system which comprises the color combining optical system set out in the foregoing, the optical system color-synthesizing a plurality of light beams from a plurality of image modulation means and a projection optical system for enlarging/projecting combined image light from the color combining optical system.

In further aspect of the above image projection optical system, |Lin/L|>4 is satisfied, where Lin is a distance from an incident pupil of the entire overall image projection optical system including the projection optical system, the color combining prism, and the positive refracting optical element to a display portion of the image modulation means, and L is a diagonal length of the image display portion of the image modulation means.

According to another aspect of the invention, there is provided a projection type image display apparatus which comprises a color separation optical system for color-separating light from a light source into a plurality of color light beams, a plurality of image modulation means illuminated with the plurality of color light beams, the color combining optical system set out in the foregoing, the optical system color-combining a plurality of color light beams from the plurality of image modulation means, and a projection optical system for enlarging/projecting combined image light from the color combining optical system.

According to another aspect of the invention, there is provided a projection type image display apparatus which comprises a color separation optical system for color-separating light from a light source into a plurality of color light beams, a plurality of image modulation means illuminated with the plurality of color light beams, and the color combining optical system set out in the foregoing, the optical system color-combining a plurality of color light beams from the plurality of image modulation means and enlarges/projects the combined light.

BRIEF DESCRIPTION OF THE DRAWINGS

FIG. 25 is an optical sectional view of a conventional liquid crystal projector.

DETAILED DESCRIPTION OF THE PREFERRED EMBODIMENTS

Figure 1:
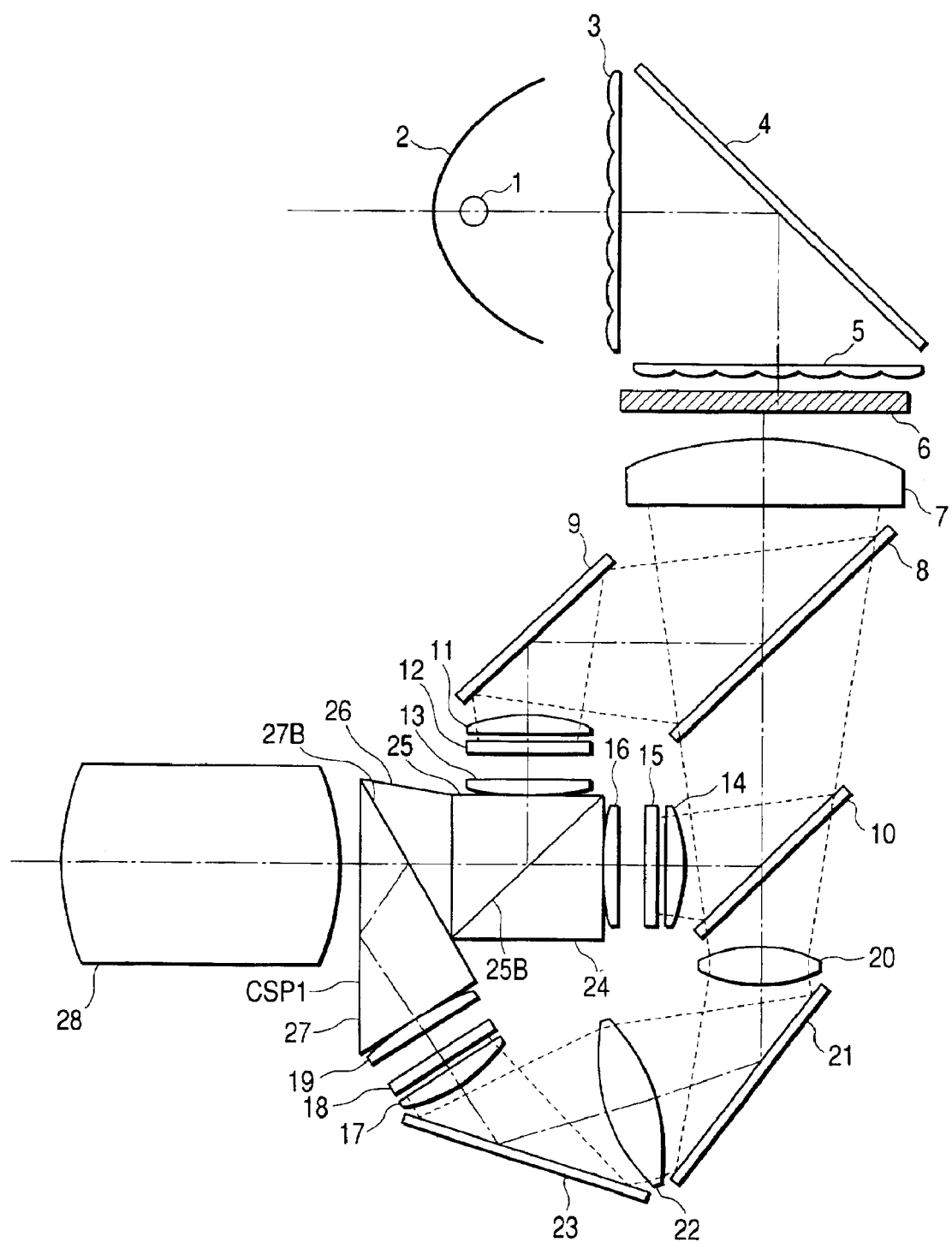
FIG. 1 is an optical sectional view of a liquid crystal projector according to the first embodiment of the present invention.

FIG. 1 is an optical sectional view of a liquid crystal projector (projection type image display apparatus) according to the first embodiment of the present invention.

The white light emitted from a light source 1 is converted into an almost parallel light beam by a parabolic mirror 2 and incident on a first flyeye lens 3 constituted by a plurality of rectangular lens arrays. Light emerging from the first flyeye lens 3 forms a light source image on an almost central portion of each cell of a second flyeye lens 5 constituted by a plurality of rectangular lens arrays through a reflecting mirror 4.

The light beams that emerge from the second flyeye lens 5 and are aligned to only one polarized component by a polarizing conversion element 6 are overlaid on liquid crystal image display panels (image modulation means to be referred to as liquid crystal panels hereinafter) 12, 15, and 18 through a first positive lens 7.

The blue light that passes through the first positive lens 7 and is reflected by a blue reflecting dichroic mirror 8 is condensed on the display portion of the liquid crystal panel 12 through a high reflecting mirror 9.

The green light component of the green and red light components passing through a blue reflecting dichroic mirror 8 is reflected by a green reflecting dichroic mirror 10 and is condensed on the display portion of the green liquid crystal panel 15 through the third positive lens 14.

The red light component passing through the green reflecting dichroic mirror 10 is condensed on the display portion of the red liquid crystal panel 18 through a fourth positive lens 20, high reflecting mirror 21, fifth positive lens 22, high reflecting mirror 23, and sixth positive lens 17.

Note the optical paths of only the red channels of the fourth and fifth positive lenses 20 and 22 are longer than those of other color channels, and hence the lenses 20 and 22 serve as relay lenses for forming the respective color light beams into images in almost equal size.

The light beams (image light beams) modulated by the liquid crystal panels 12, 15, and 18 of the respective colors are color-combined by a color combining prism CSP1. The color-combined image emerging from the color combining prism CSP1 is enlarged/projected as a color image on a screen (not shown) by a projection lens (projection optical system) 28.

Note that the color combining prism CSP1 is comprised of four prisms, i.e., a first prism 27, second prism 26, third prism 25, and fourth prism 24.

Positive lenses (positive refracting optical elements) 13, 16, and 19 are respectively arranged between the color combining prism CSP1 and the liquid crystal panels 12, 15, and 18.

With this arrangement of the positive lenses 13, 16, and 19, since the light beams passing through the peripheral portions of the display portions of the liquid crystal panels 12, 15, and 18 converge, the effective aperture of the color combining prism CSP1 on the exit side can be reduced. This makes it possible to reduce the overall size of the color combining prism CSP1.

Figure 2A:
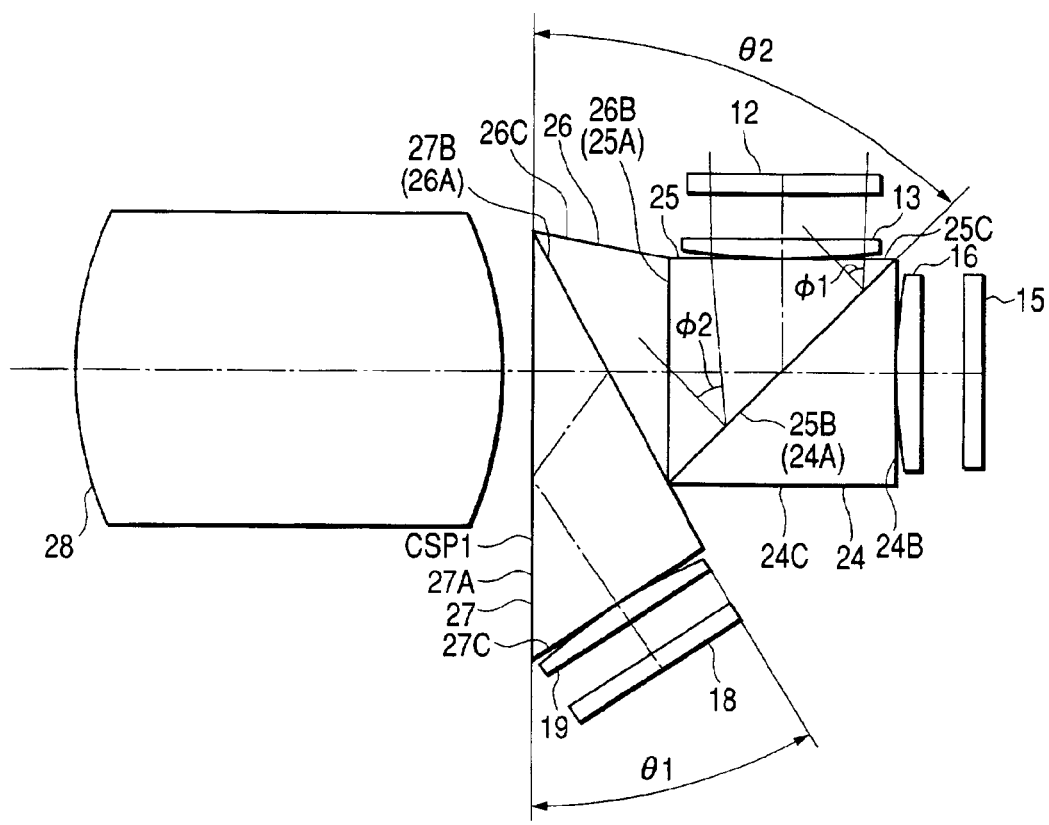
FIGS. 2A and 2B are optical sectional views of a color combining optical system in the liquid crystal projector according to the first embodiment.

FIG. 2A is an optical sectional view of the color combining optical system and projection lens 28 in the liquid crystal projection of this embodiment.

The first prism 27 of the color combining prism CSP1 is comprised of a surface 27A serving as both a transmitting surface and total reflecting surface, a dichroic surface 27B on which a dichroic film that reflects a red light component and transmits blue and green light components is formed, and a transmitting surface 27C.

The second prism 26 includes two transmitting surfaces 26A and 26B. The third prism 25 is comprised of two transmitting surfaces 25A and 25C and a dichroic surface 25B on which a dichroic film that reflects a blue light component and transmits a green light component is formed.

The fourth prism 24 includes two transmitting surfaces 24A and 24B.

Referring to FIG. 2A, antireflection coatings are formed on the transmitting surfaces 27A, 27C, 25C, and 24B to prevent light amount losses due to surface reflected light produced on the interfaces between the air and the glass surfaces.

A surface 26C of the second prism 26 and a surface 24C of the fourth prism 24 are formed into sandblasted surfaces instead of polished surfaces, which are coated with a black paint, to prevent the occurrence of ghost due to internal reflection inside the prisms.

Note that the dichroic film formed on the dichroic surface 27B of the first prism 27 may be formed on the transmitting surface 26A of the second prism 26. Since the second prism 26 is smaller than the first prism 27, many prisms can be placed in an evaporation kiln when dichroic films are evaporated. This makes it possible to reduce the manufacturing cost.

The dichroic film formed on the dichroic surface 25B of the third prism 25 may be formed on the transmitting surface 24A of the fourth prism 24.

Unlike a conventional prism constituted by three prisms used for color separation prism or the like, the color combining prism CSP1 in this embodiment is constituted by four prisms to decrease the optical path length of the prism.

By splitting the prism sandwiched between the two dichroic films 27B and 25B into two prisms, one of the two prisms which is located on the incident side can be reduced in size. The remaining prism on the exit side is set to a size and shape that prevent vignetting of an effective light beam.

As the color combining prism CSP1, a glass having a higher refractive index than conventional glass to reduce the optical path length of the prism at the time of air conversion. For example, S-BSM25 (refractive index for d line: 1.65844; Abbe number: 50.9) and S-BSM15 (refractive index for d line: 1.62299; Abbe number: 58.2) available from Ohara Inc. have high refractive indexes and hence are preferably used.

By setting an angle $\theta 1$ defined by the dichroic surface 27B between the first and second prisms 27 and 26 and the surface 27A of the first prism 27 to 28°, the optical path length of the prism could be reduced, and the occurrence of ghosts due to reflection on the dichroic surface 27B could be suppressed. In addition, the total reflection conditions on the exit surface 27A of the first prism 27 could be sufficiently satisfied.

By setting an angle $\theta 2$ defined by the dichroic surface 25B between the third and fourth prisms 25 and 24 and the exit surface 27A of the first prism 27 to 45°, the optical path length of the prism could be reduced.

By reducing the optical path length of the prism, the prism itself can be reduced in size and the back focus of the projection lens can also be reduced. This makes it possible to reduce the size of the projection lens and improve its function.

Figure 2B:
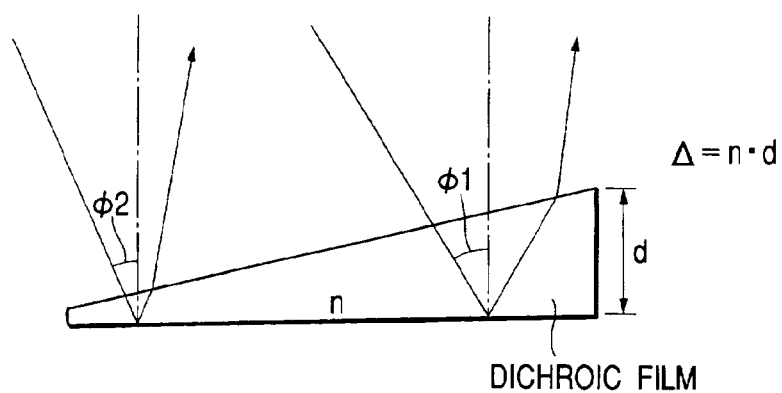

If the positive lenses 13, 16, and 19 are arranged between the color combining prism CSP1 and the liquid crystal panels 12, 15, and 18, the incident angle of the dichroic surface 25B (27B) changes (more specifically, an incident angle $\phi 1$ of the dichroic film located at a near side to the positive lens > an incident angle $\phi 2$ located at a far side from the positive lens) depending on the position of the dichroic surface, as shown in FIGS. 2A and 2B. For this reason, the image projected on the screen (not shown) may suffer brightness unevenness or color unevenness.

In this embodiment, however, as shown in FIG. 2B, a dichroic film is formed as an inclined film to gradually increase or decrease the optical thickness ($\Delta = n \cdot d$) of the dichroic film from one end to the other end in the inclining direction of the dichroic film with respect to the incident optical axis of light that is reflected by the dichroic film and incident on the dichroic film.

The optical thickness ($\Delta$) may be changed by changing the thickness (d) of the dichroic film or the refractive index (n).

In this embodiment, the inclined film is formed such that the optical thickness of the dichroic film on the side where the incident angle is large ($\phi 1$) is larger than the optical length of the dichroic film on the side where the incident angle is small ($\phi 2$).

More specifically, since the incident angle on the upper side of the dichroic film (25B) in FIG. 2A is larger than the incident angle on the lower side of the dichroic film, the inclined film is formed such that the film thickness on the upper side is larger than the film thickness on the lower side.

In addition, since the incident angle on the lower side of the dichroic film (27B) in FIG. 2A is larger than the incident angle on the upper side of the dichroic film, the inclined film is formed such that the film thickness on the lower side is larger than the film thickness on the upper side. Forming a dichroic film into an inclined surface can make the reflection characteristics of the dichroic film uniform with respect to light beams incident at different incident angles depending on the positions on the film, thereby eliminating brightness unevenness and color unevenness on a projected image.

Note that to prevent contrast unevenness, the liquid crystal panels 13, 16, and 19 are designed such that illumination light from the light source 1 becomes telecentric.

(Second Embodiment)

Figure 3:
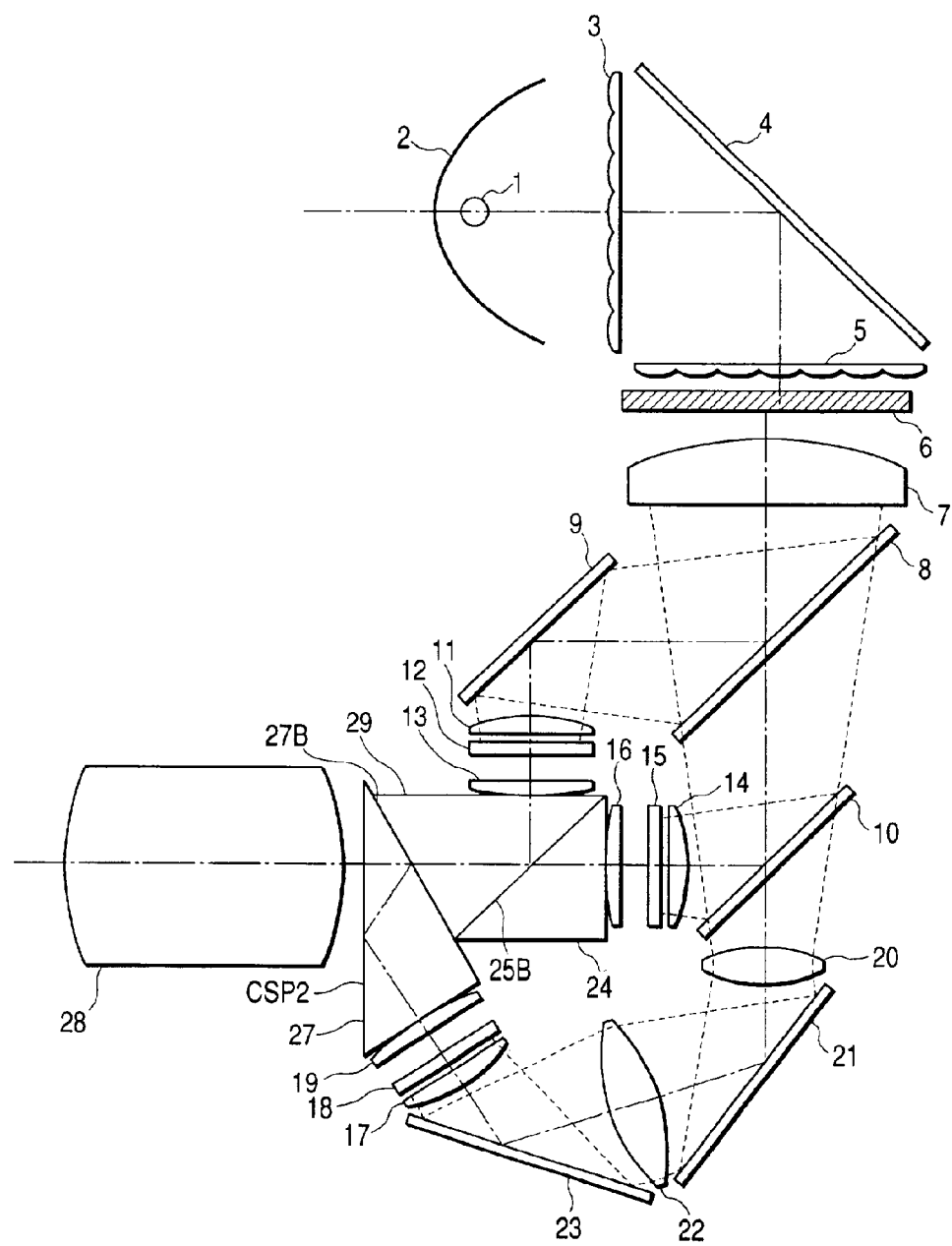
FIG. 3 is an optical sectional view of a liquid crystal projector according to the second embodiment of the present invention.

FIG. 3 is an optical sectional view of a liquid crystal projector according to the second embodiment of the present invention. Note that the same reference numerals as in the first embodiment denote the same parts in this embodiment.

This embodiment has almost the same arrangement as that of the first embodiment except for the arrangement of a color combining prism CSP2.

The color combining prism CSP2 in this embodiment is comprised of a first prism 27, second prism 29, and third prism 24. This arrangement allows a reduction in the number of components to be used as compared with the arrangement of the color combining prism CSP1 constituted by four prisms in the first embodiment, thus realizing a color combining prism at a lower cost.

Figure 4:
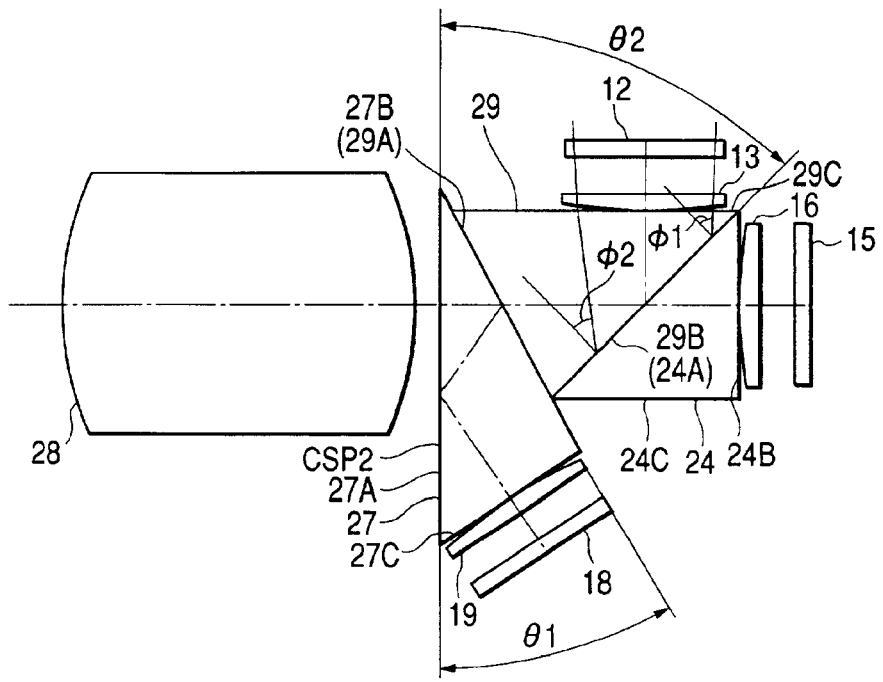
FIG. 4 is an optical sectional view of a color combining optical system in the liquid crystal projector according to the second embodiment.

FIG. 4 is a sectional view of a color combining optical system and projection lens 28 in this embodiment.

In this embodiment, by further increasing the positive refractive powers of positive lenses 13, 16, and 19 as compared with the first embodiment, the effective aperture of the color combining prism CSP2 on the exit side is further decreased. This makes it possible to replace the two prisms 26 and 25 placed between the dichroic surfaces 27B and 25B in this embodiment with the single second prism 29.

In this embodiment, as in the first embodiment, the two dichroic films (27B and 29B) in the color combining prism CSP2 are formed into inclined films to eliminate brightness unevenness and color unevenness in a projected image.

(Third Embodiment)

Figure 5:
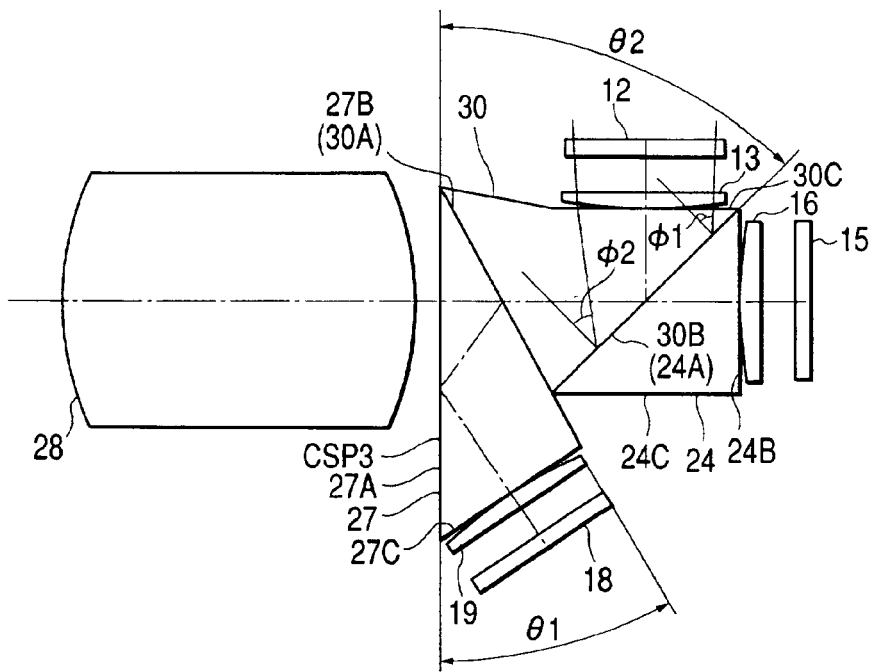
FIG. 5 is an optical sectional view of a color combining optical system in a liquid crystal projector according to the third embodiment.

FIG. 5 is a sectional view of the color combining optical system and projection lens 28 of a liquid crystal projector (projection type image display apparatus) according to the third embodiment of the present invention. Note that the same reference numerals as in the first embodiment denote the same parts in this embodiment.

This embodiment has almost the same arrangement as that of the first embodiment except for the arrangement of a color combining prism CSP3.

In the color combining prism CSP3 of this embodiment, the two prisms 26 and 25 placed between the dichroic surfaces 27B and 25B in the first embodiment are integrated into one second prism 30. If the prism 30 is formed by plastic molding, the shape of the second prism 30 can be realized.

In this embodiment, as in the first embodiment, the two dichroic films (27B and 30B) in the color combining prism CSP3 are formed into inclined films to eliminate brightness unevenness and color unevenness in a projected image.

(Fourth Embodiment)

Figure 6:
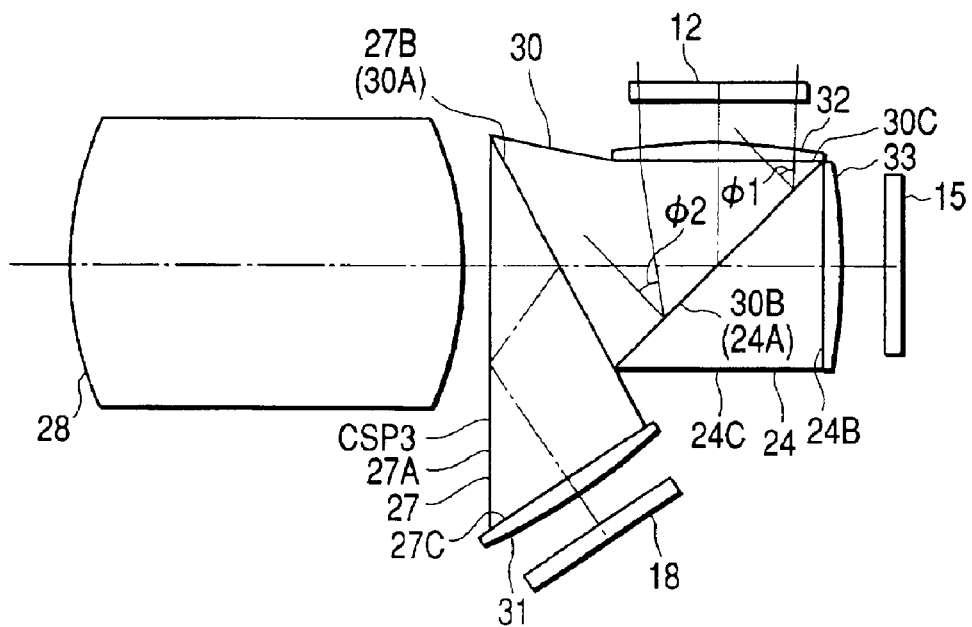
FIG. 6 is an optical sectional view of a color combining optical system in a liquid crystal projector according to the fourth embodiment.

FIG. 6 is a sectional view of the color combining optical system and projection lens 28 of a liquid crystal projector (projection type image display apparatus) according to the fourth embodiment of the present invention. Note that the same reference numerals as in the third embodiment denote the same parts in this embodiment.

In this embodiment, positive lenses (positive refracting optical elements) 31, 32, and 33 are joined to the incident surfaces 27C, 30C, and 24B of the color combining prism CSP3 in the third embodiment to realize an integrated color combining optical system as a whole.

According to this embodiment, the formation of antireflection coatings on surfaces, of the incident surfaces 27C, 30C, an 24B and positive lenses 31, 32, and 33 of the color combining prism CSP3, which oppose the color combining prism CSP3 can be omitted.

(Fifth Embodiment)

Figure 7:
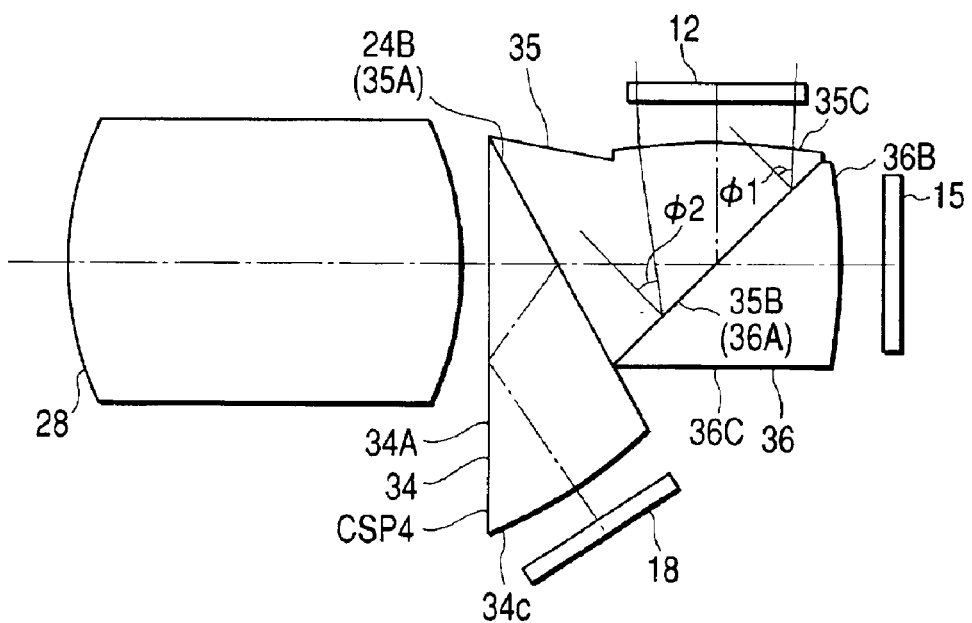
FIG. 7 is an optical sectional view of a color combining optical system in a liquid crystal projector according to the fifth embodiment.

FIG. 7 is a sectional view of the color combining optical system and projection lens 28 of a liquid crystal projector (projection type image display apparatus) according to the fifth embodiment of the present invention. Note that the same reference numerals as in the third embodiment denote the same parts in this embodiment.

In this embodiment, portions corresponding to the positive lenses (positive refracting optical elements) 31, 32, and 33 are integrally formed on the color combining prism CSP3 in the third embodiment to realize an integrated color combining optical system and reduce the number of components to be used.

More specifically, an incident surface 34C of a first prism 34 is made to have a positive refractive power. Likewise, an incident surface 35C of a second prism 35 and an incident surface 36B of a third prism 36 are made to have positive refractive powers, respectively.

EXAMPLE 1

Figure 8:
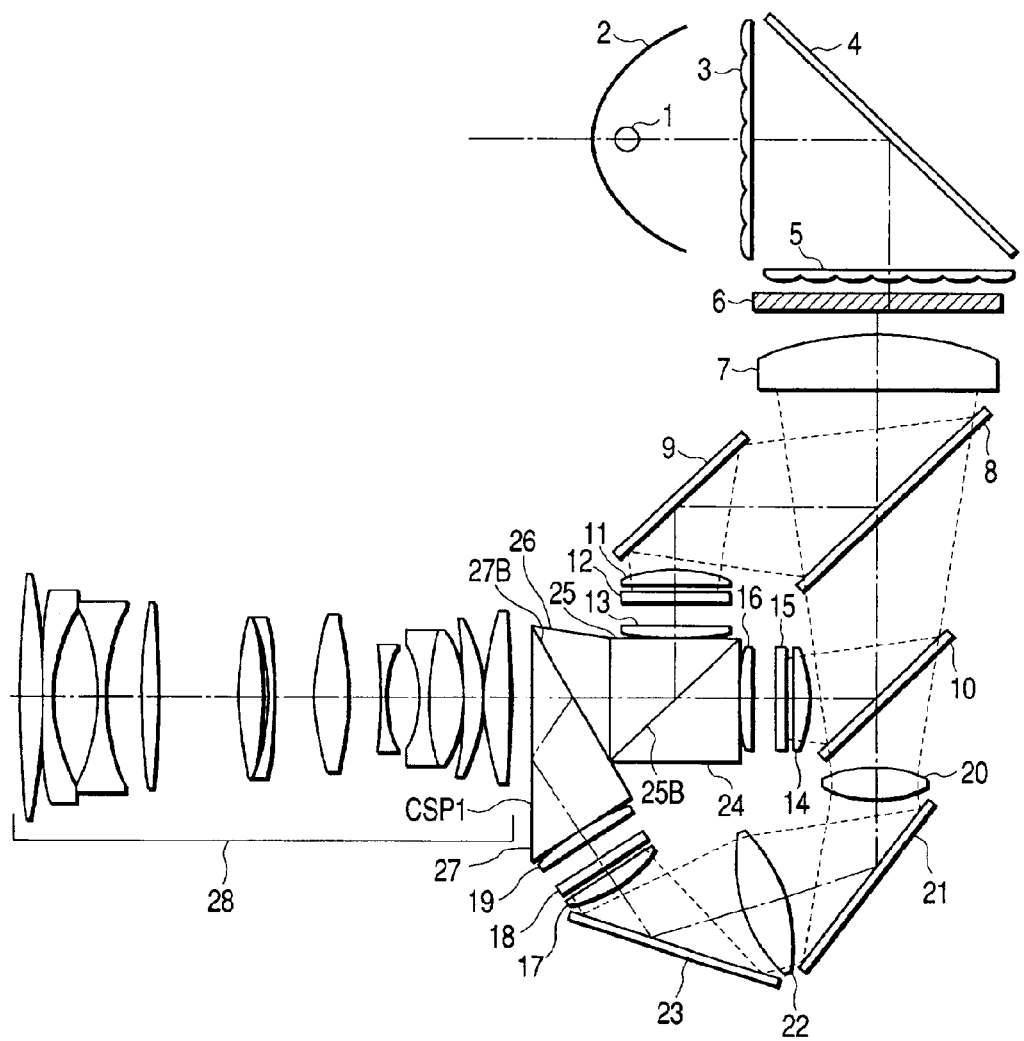
FIG. 8 is an optical sectional view showing Example 1 of the color combining optical system according to the first embodiment.

FIG. 8 shows an example of the first embodiment. In Example 1, the projection lens 28 is designed to optimize the optical performance when the color combining prism CSP1 is combined with the positive lenses 13, 16, and 19. Since the projection lens 28 is designed such that the positive lenses 13, 16, and 19 are located near the liquid crystal panels 12, 15, and 18, the lens aperture on the panel side can be reduced, and reductions in size and weight of the overall apparatus can be attained.

To correct the chromatic aberration of magnification of the projection lens 28, the positive lenses 13, 16, and 19 may have slightly different focal lengths or the dispositions of these lenses may be slightly changed.

Figure 9:
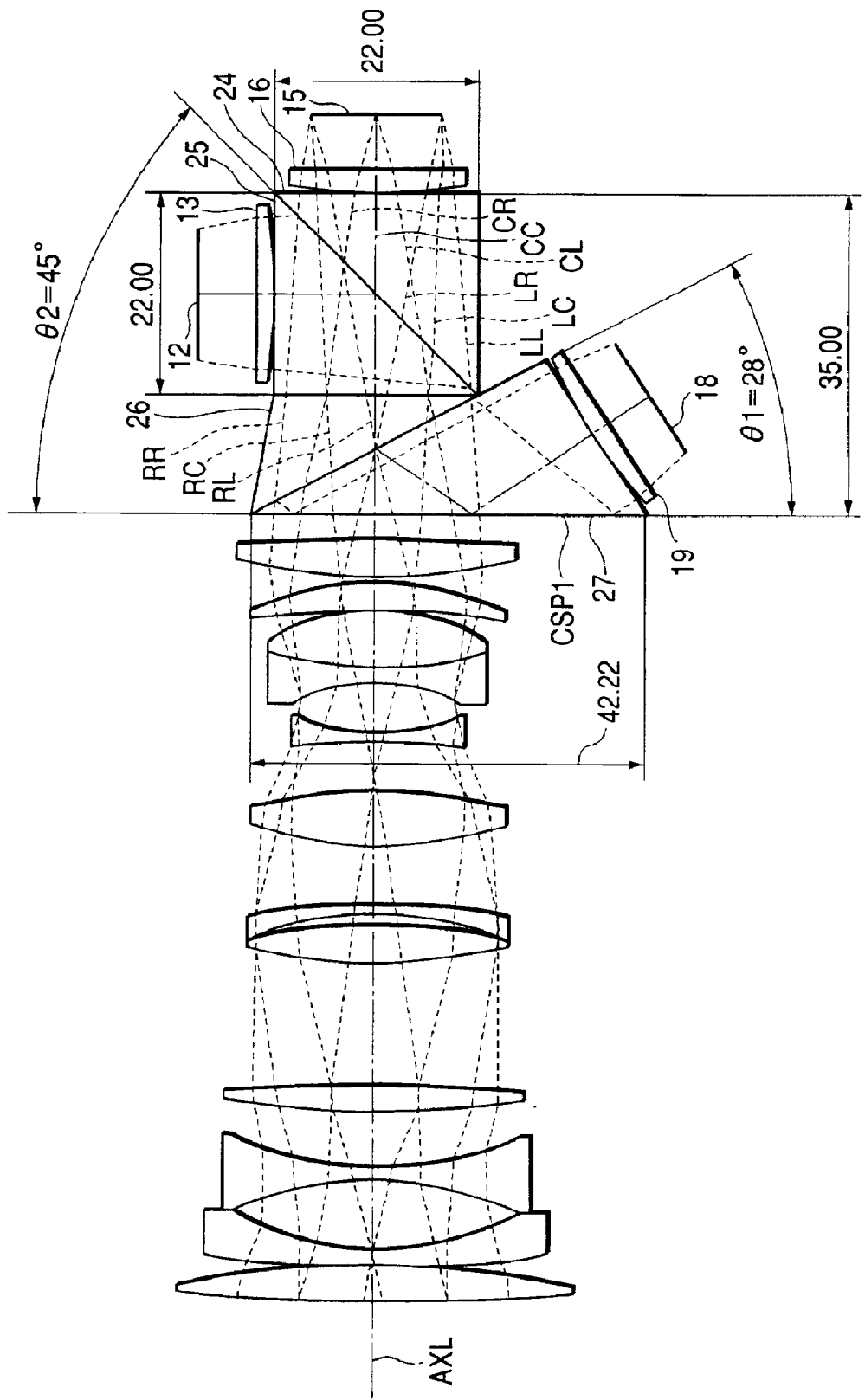
FIG. 9 is a ray diagram in the longitudinal direction of a liquid crystal panel according to Example 1.

FIG. 9 is a ray diagram in the longitudinal direction of the liquid crystal panel in Example 1 shown in FIG. 8. This example is designed for a liquid crystal panel having a display portion with a diagonal length of 0.7 inches.

As the material for the color combining prism, S-BSM15 available from Ohara Inc. is used. In this example, a reduction in prism optical path length at the time of air conversion is attained by increasing the refractive index of the prism in this example as compared with a case where S-BSL7 available from Ohara Inc. is used for a conventional cross-dichroic prism.

In this example, the optical actions of the positive lenses 13, 16, and 19 arranged between the color combining prism CSP1 and the liquid crystal panels 12, 15, and 18 minimize the divergence of a light beam inside the color combining prism CSP1. This made it possible to greatly reduce the length of one side of each of the prisms 24 and 25 constituting the color combining prism CSP1 to 22 mm.

In the case of a conventional cross-dichroic prism, the length of one side of each prism needs to be 26 mm when 0.7-inch liquid crystal panel is used.

As described above, in this example, since the divergence of a light beam inside the color combining prism CSP1 can be suppressed, the distance between the adjacent liquid crystal panels 12 and 15 can be decreased as compared with the case where a conventional cross-dichroic prism is used. As a consequence, the color separation optical system can be reduced in size to realize a very compact liquid crystal projector as a whole.

Figure 10:
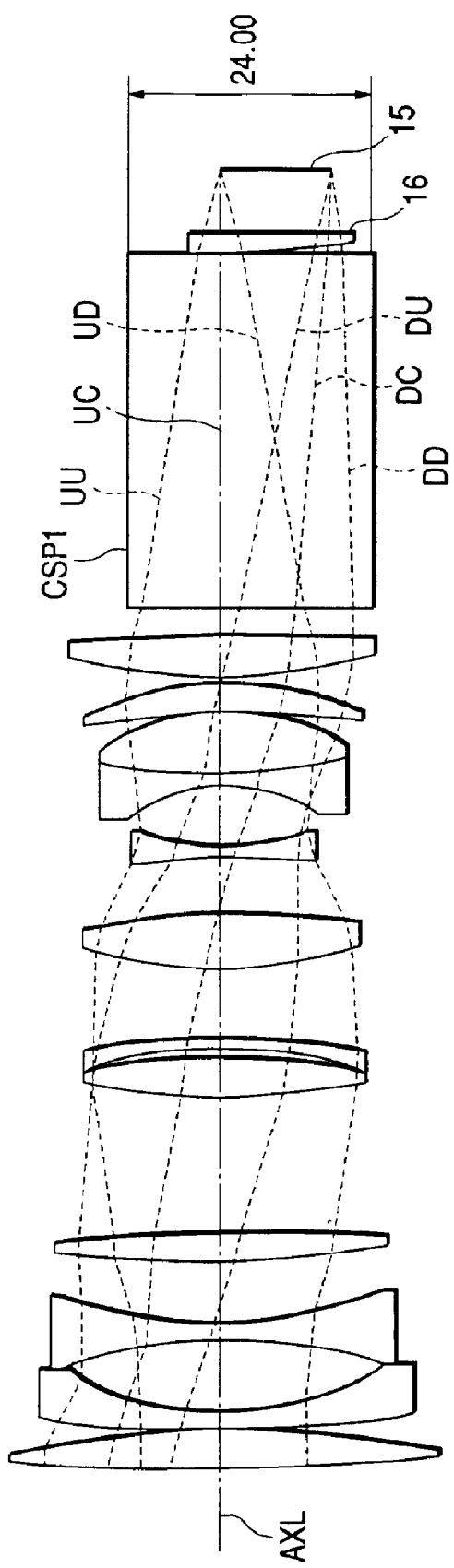
FIG. 10 is a ray diagram in the widthwise direction of the liquid crystal panel according to Example 1.

FIG. 10 is a ray diagram in the widthwise direction of the liquid crystal panel in Example 1 shown in FIG. 8. The optical action of the positive lens 16 placed between the color combining prism CSP1 and the liquid crystal panel 15 minimizes the divergence of a light beam inside the color combining prism CSP1, as in the arrangement shown in FIG. 9. A light beam DD at the lower end of the color combining prism CSP1 in FIG. 10, in particular, was almost parallel to the lower end of the color combining prism CSP1, and hence the height of the prism on the exit side of the color combining prism CSP1 could be greatly reduced.

EXAMPLE 2

Figure 11:
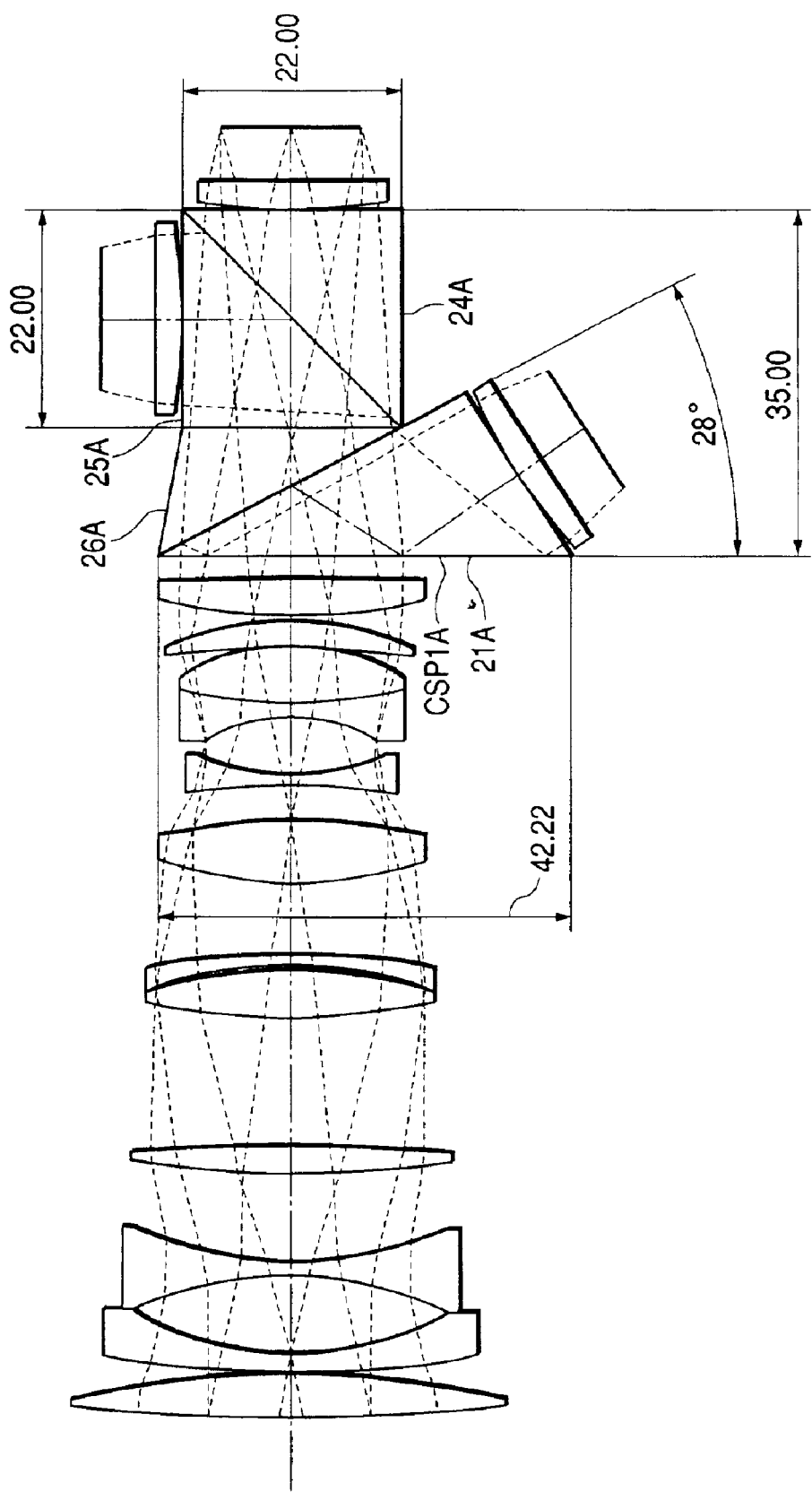
FIG. 11 is a ray diagram in the longitudinal direction of a liquid crystal panel according to Example 2 of the color combining optical system of the first embodiment.

FIG. 11 is a sectional view of the display portion of the liquid crystal panel in the longitudinal direction according to Example 2 of the first embodiment. This example is also designed for a liquid crystal panel having a display portion with a diagonal length of 0.7 inches.

A color combining prism CSP1A of this example has the same shape as that in Example 1, but differs therefrom in that S-BSL7 available from Ohara Inc. is used as a glass material. The advantages in using S-BSL7 as a prism material are that color dispersion is small owing to a large Abbe number, and hence the chromatic aberration of magnification is small in the prism, and the specific gravity is as small as 2.52 as compared with the specific gravity of S-BSM15, which is 3.6.

In this example, as in the first embodiment, the optical action of the positive lens placed between the liquid crystal panel and the color combining prism CSP1A could suppress the divergence of a light beam inside the prism.

Figure 12:
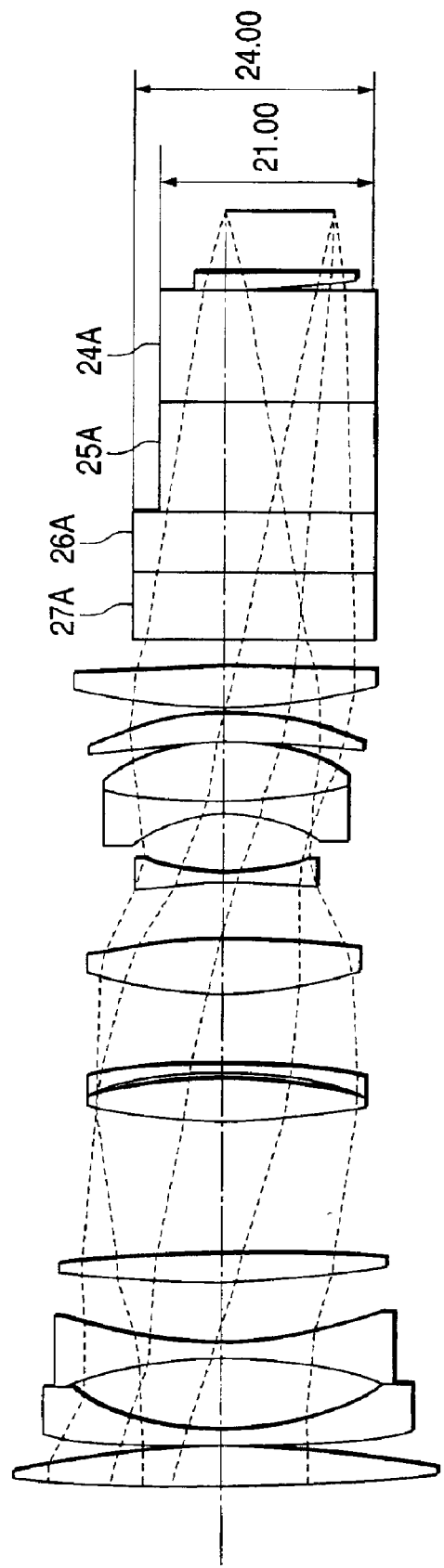
FIG. 12 is a ray diagram in the widthwise direction of the liquid crystal panel in Example 2.

FIG. 12 is a sectional view of the display portion of the liquid crystal panel in the widthwise direction according to Example 2. In this example, the prisms 24A and 25A are made shorter than the prisms 26A and 27A to realize a reduction in weight of the color combining prism CSP1A as a whole.

EXAMPLE 3

Figure 13:
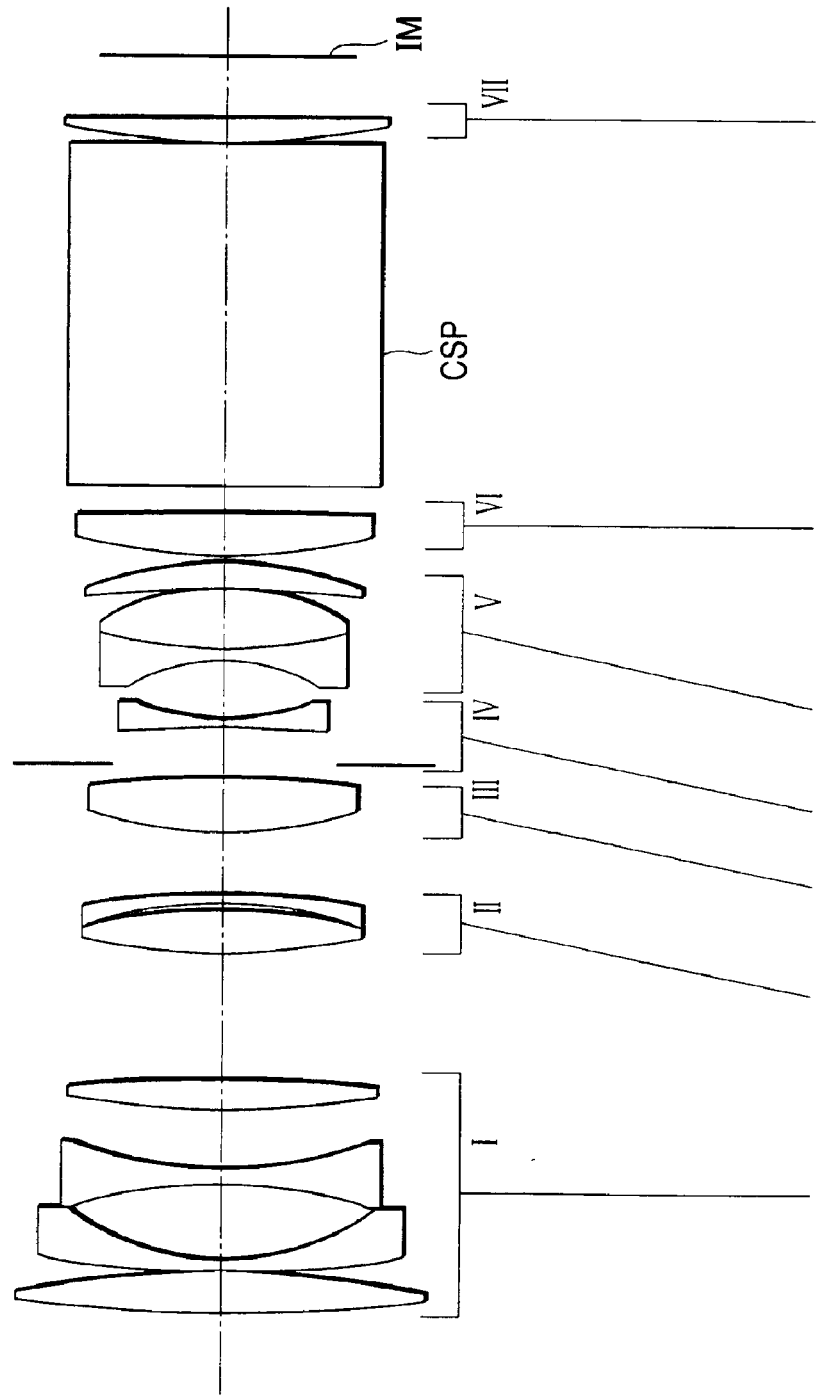
FIG. 13 is a sectional view of a projection lens according to Example 3 of the present invention.

FIG. 13 is a sectional view of a projection lens according to Example 3. In this example, the projection lens is comprised of the following lens groups sequentially arranged from the screen side (not shown): a first lens group I with a negative refractive power, a second lens group II with a positive refractive power, a third lens group III with a positive refractive power, a fourth lens group IV with a negative refractive power, a fifth lens group V with a positive refractive power, a sixth lens group VI with a position refractive power, a color combining prism CSP, and a seventh lens group VII with a positive refractive power. When the magnification is changed from the maximum wide-angle state to the maximum telephoto state, the second lens group II, third lens group III, fourth lens group IV, and fifth lens group V are moved to the screen side (not shown). Note that the fifth lens group V may be a weak negative lens group.

In this example, the image plane position is corrected upon screen distance fluctuation by moving the first lens group in the optical axis direction. In this example, since the seventh lens group VII is placed between the color combining prism CSP and an image display surface IM of the liquid crystal panel, the lens aperture on the color combining prism CSP side can be reduced as compared with a conventional projection lens that is telecentric on the liquid crystal panel side.

Figure 16:
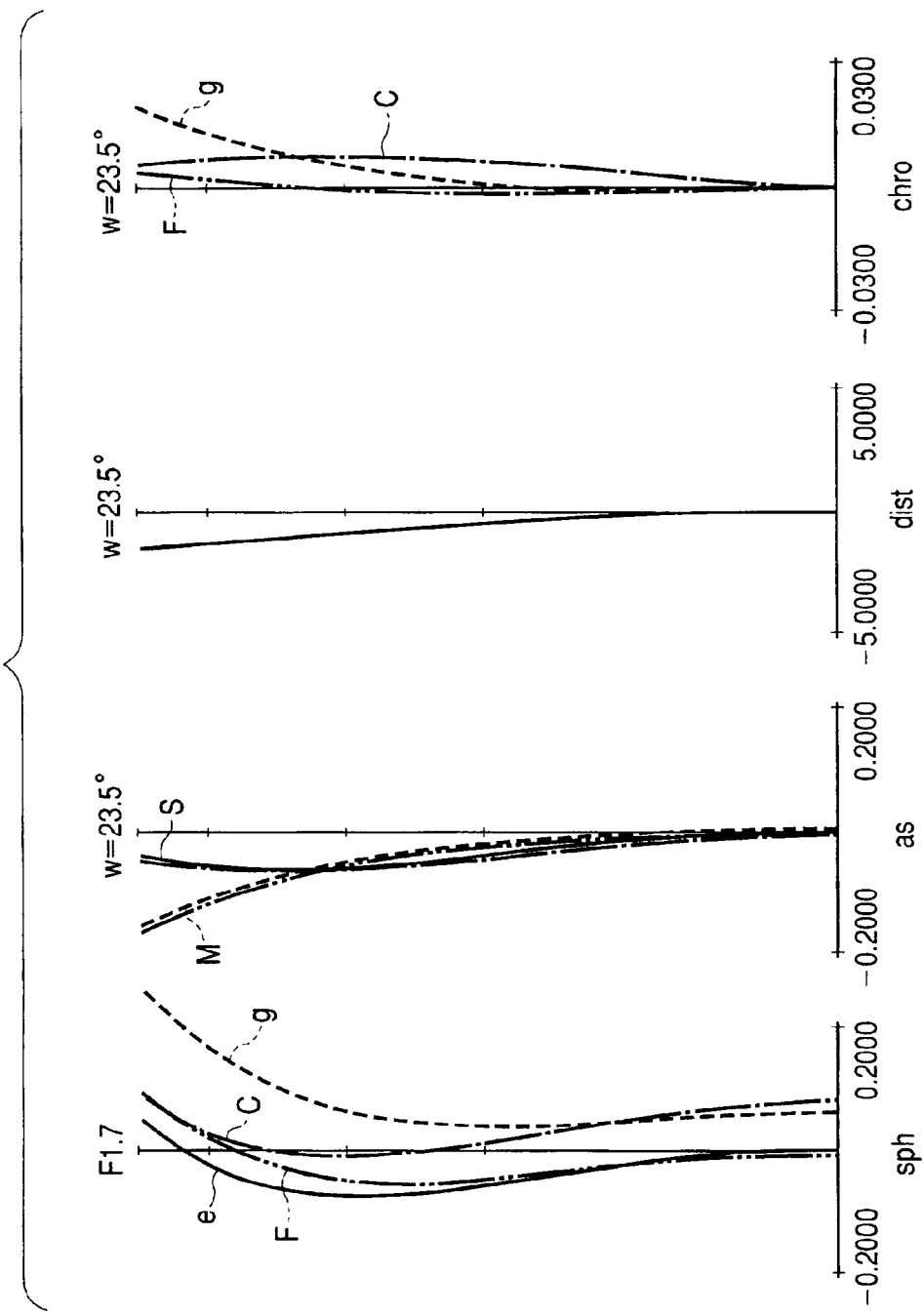
FIG. 16 is a view showing aberration curves at the maximum wide-angle state position of the projection lens according to Example 3.
Figure 17:
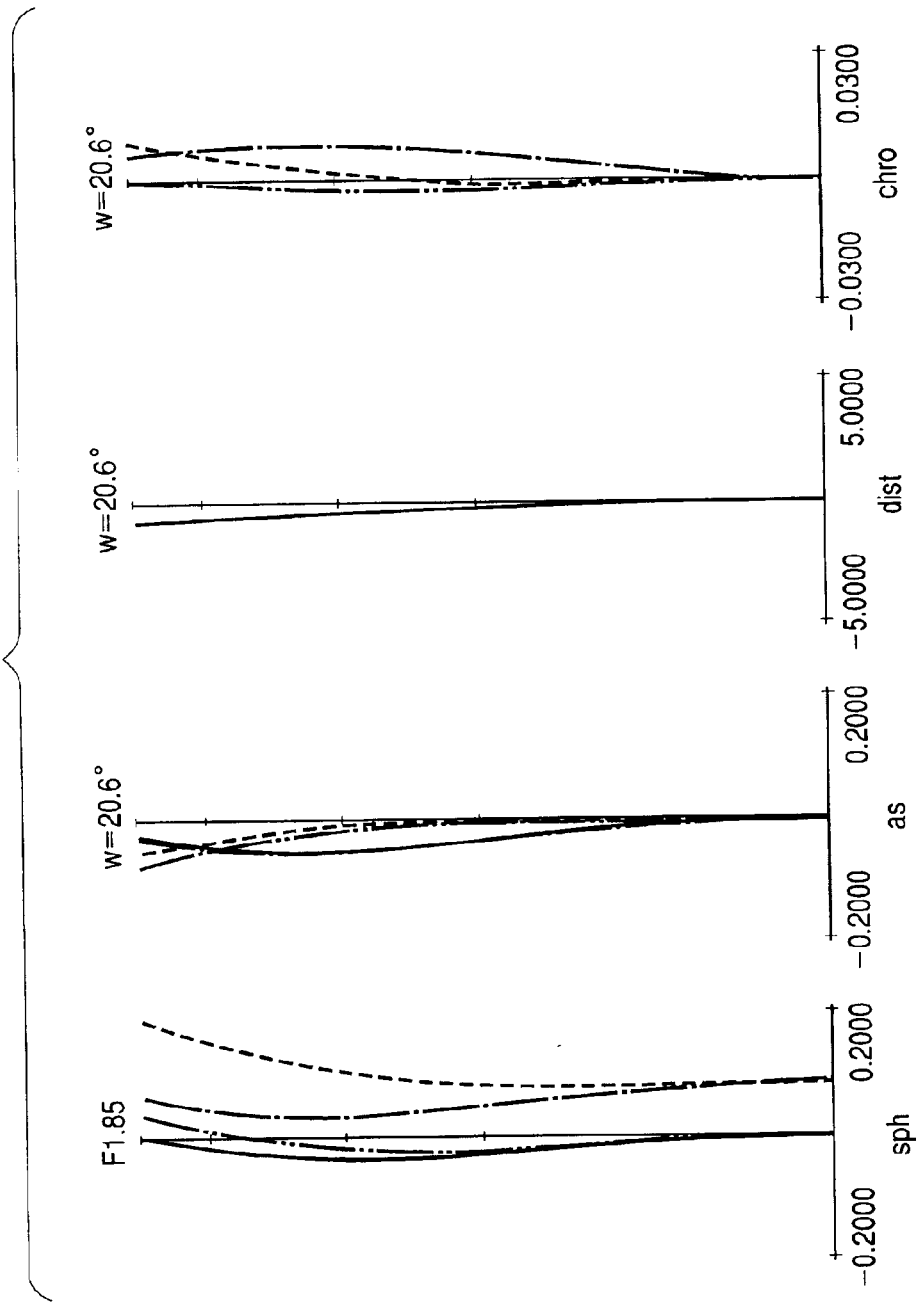
FIG. 17 is a view showing aberration curves at the intermediate position of the projection lens according to Example 3.
Figure 18:
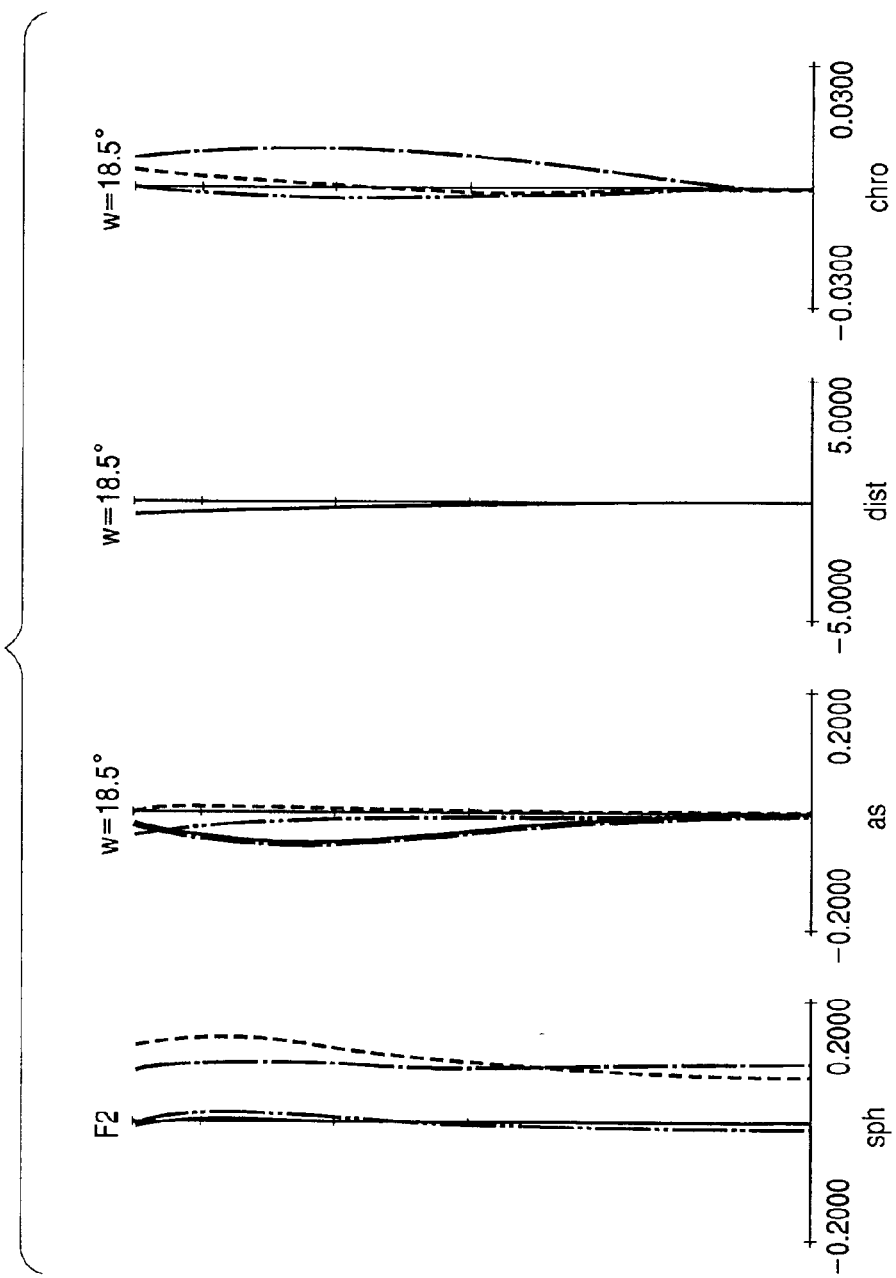
FIG. 18 is a view showing aberration curves at the maximum telephoto state position of the projection lens according to Example 3.

FIGS. 16 to 18 show aberration curves at the maximum wide-angle state position, intermediate position, and maximum telephoto state position of the projection lens according to this example.

EXAMPLES 4 AND 5

Figure 14:
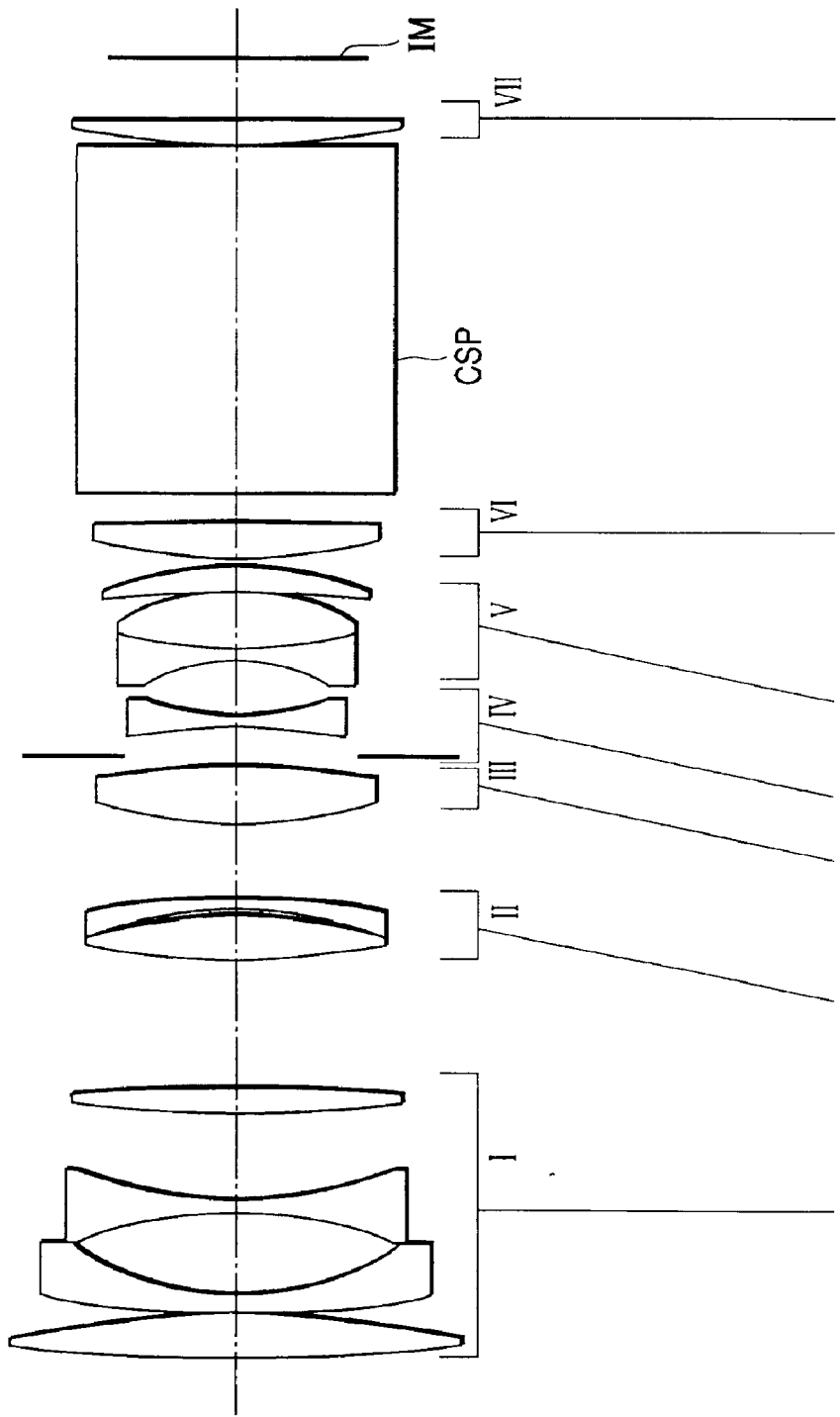
FIG. 14 is a sectional view of a projection lens according to Example 4 of the present invention.
Figure 15:
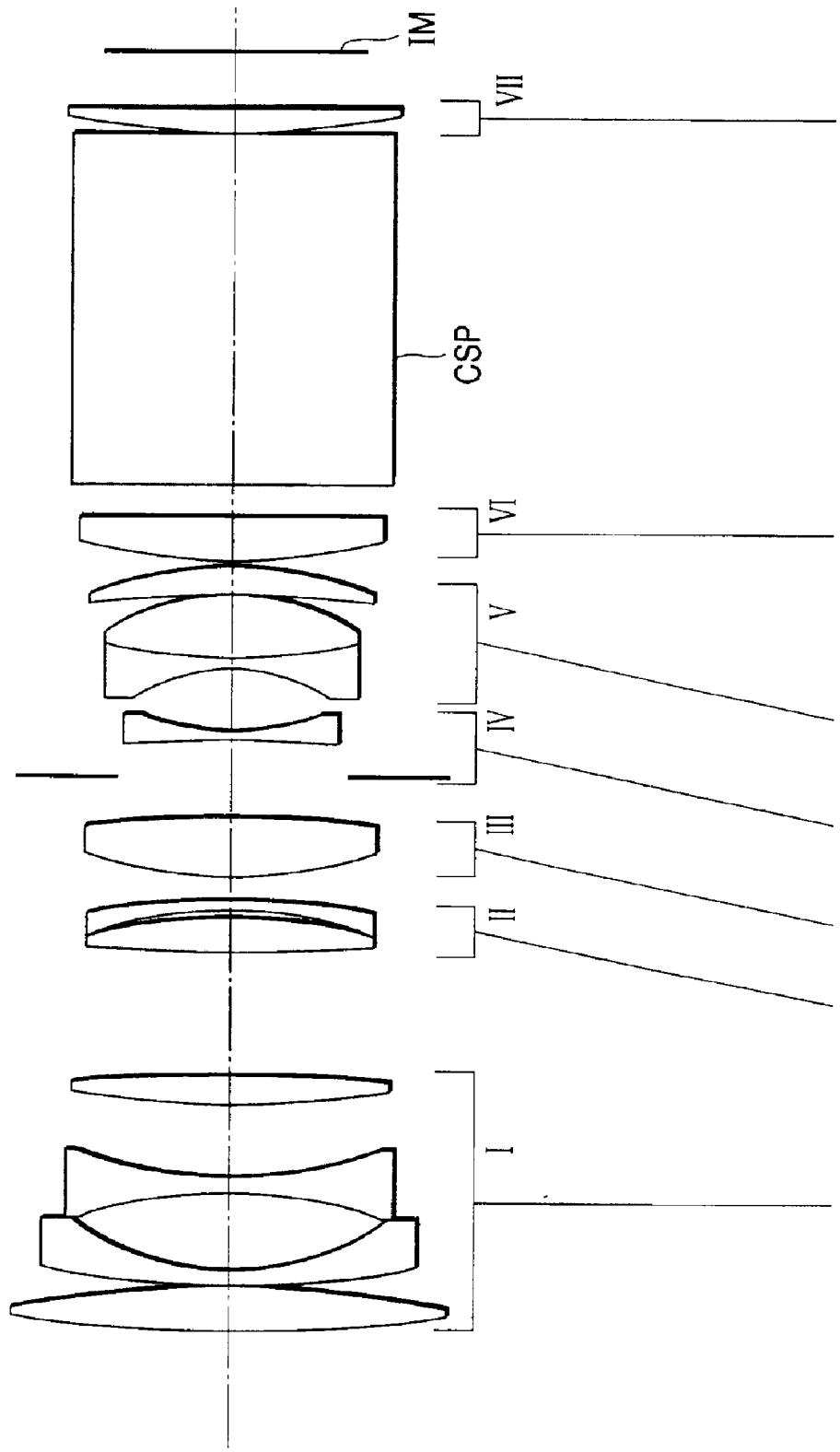
FIG. 15 is a sectional view of a projection lens according to Example 5 of the present invention.

FIG. 14 is a sectional view of a projection lens as Numerical Example 4. FIG. 15 is a sectional view of a projection lens as Numerical Example 5.

In these examples as well, the projection lens is comprised of the following lens groups sequentially arranged from the screen side (not shown): a first lens group I with a negative refractive power, a second lens group II with a positive refractive power, a third lens group III with a positive refractive power, a fourth lens group IV with a negative refractive power, a fifth lens group V with a positive refractive power, a sixth lens group VI with a position refractive power, a color combining prism CSP, and a seventh lens group VII with a positive refractive power.

Note that the operation of the projection lenses according to these examples is the same as that of the projection lens according to Numerical Example 3 in FIG. 13.

Figure 19:
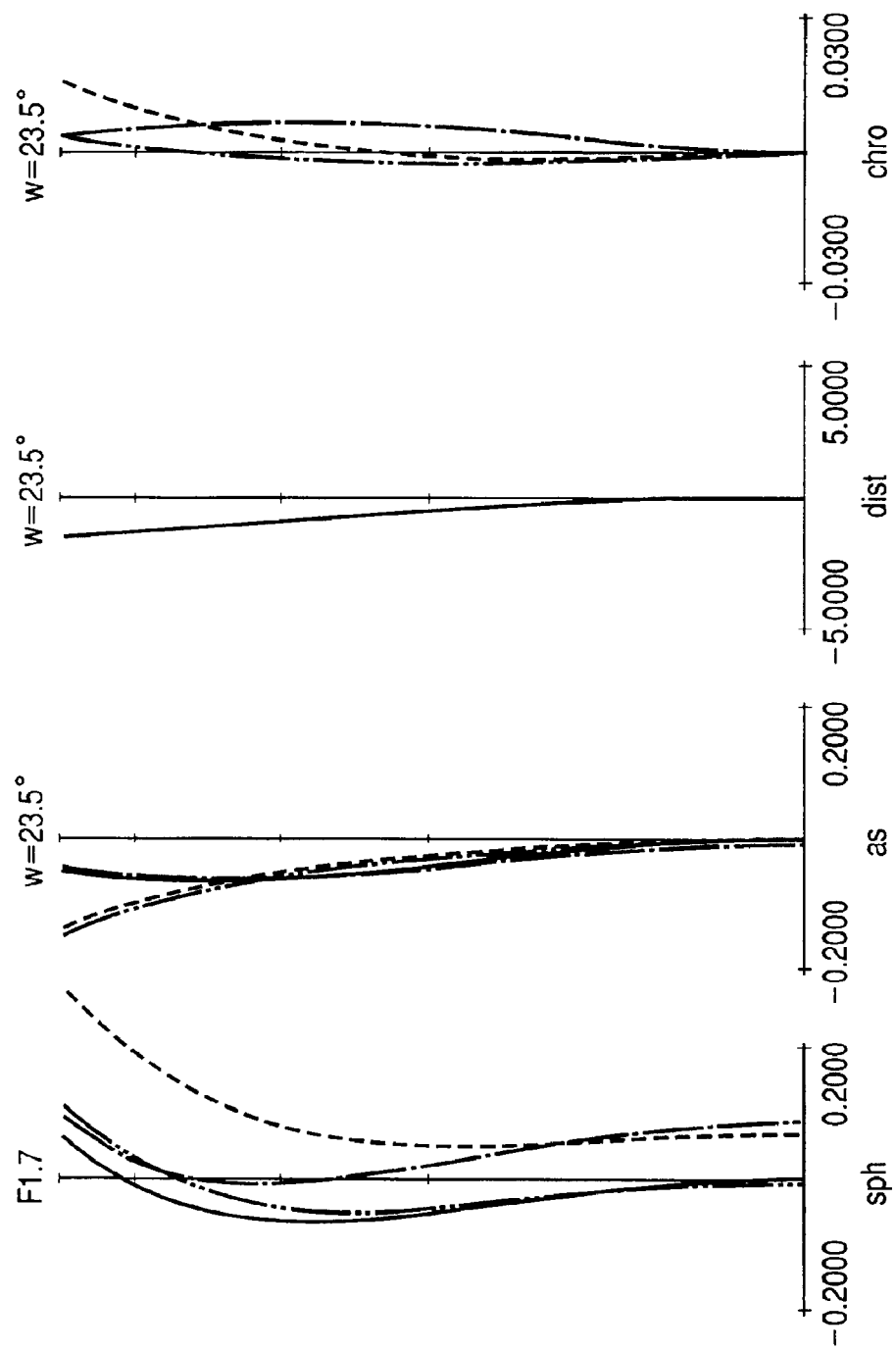
FIG. 19 is a view showing aberration curves at the maximum wide-angle state position of the projection lens according to Example 4.
Figure 20:
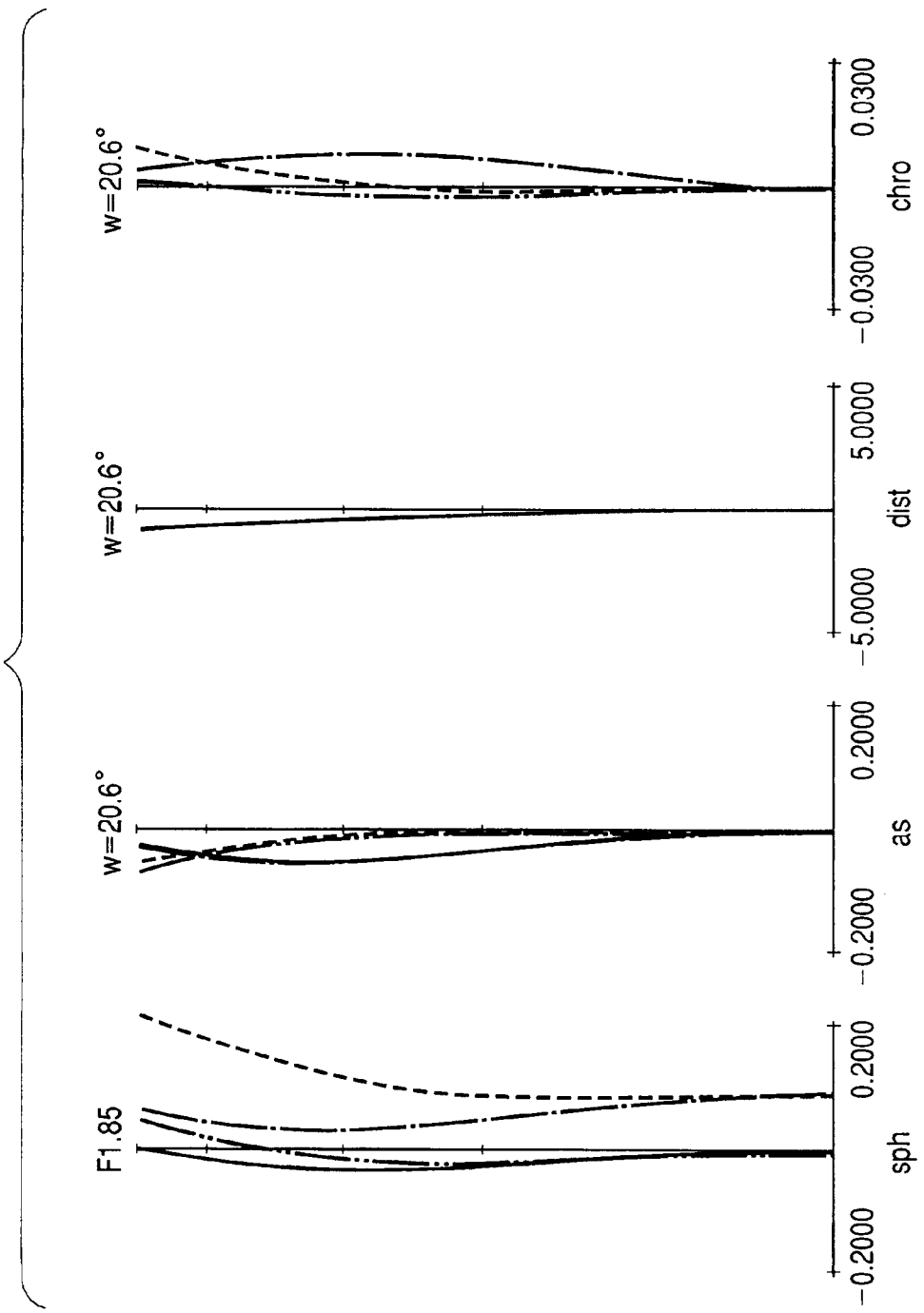
FIG. 20 is a view showing aberration curves at the intermediate position of the projection lens according to Example 4.
Figure 21:
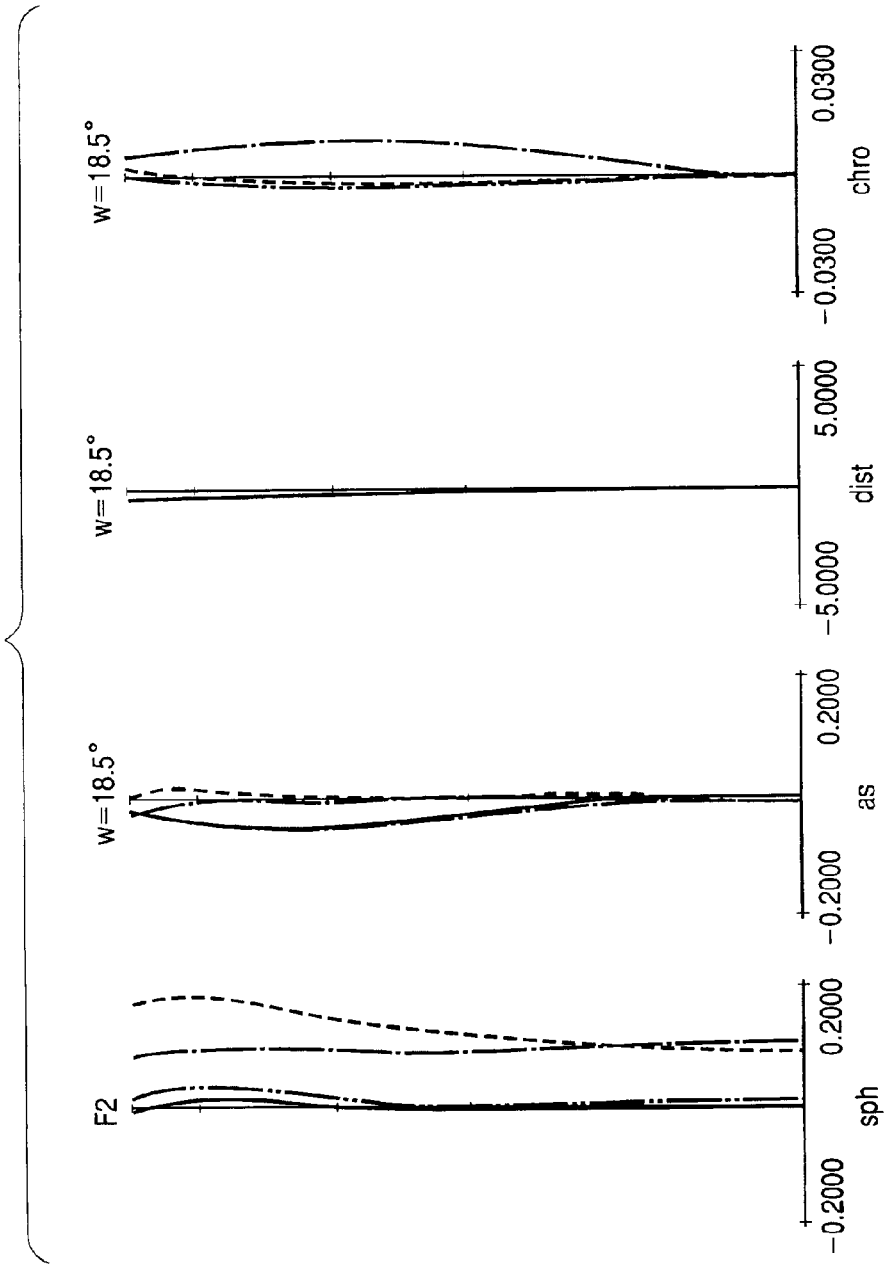
FIG. 21 is a view showing aberration curves at the maximum telephoto state position of the projection lens according to Example 4.

FIGS. 19 to 21 show aberration curves at the maximum wide-angle state position, intermediate position, and maximum telephoto state position of the projection lens according to Example 4.

Figure 22:
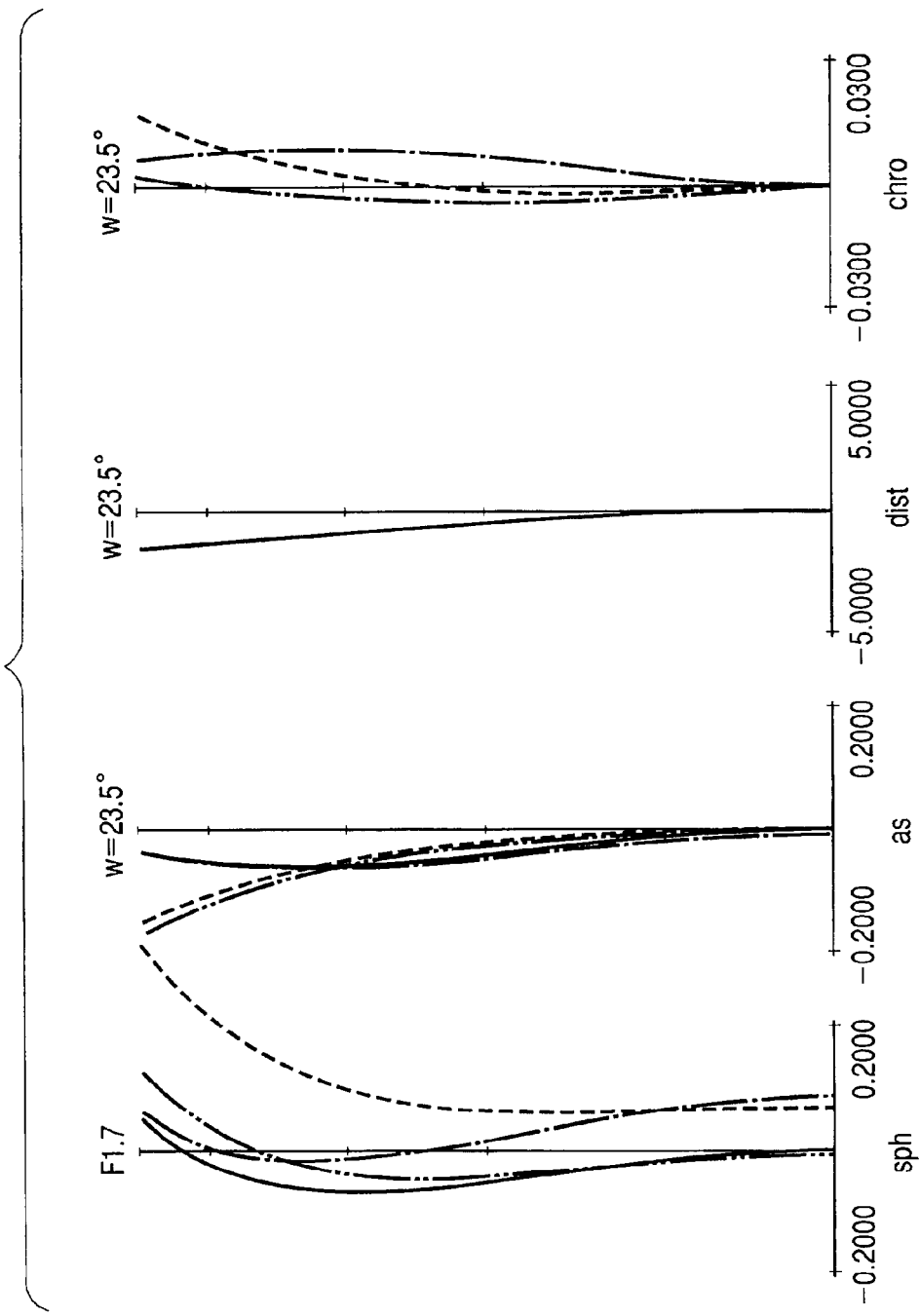
FIG. 22 is a view showing aberration curves at the maximum wide-angle state position of the projection lens according to Example 5.
Figure 23:
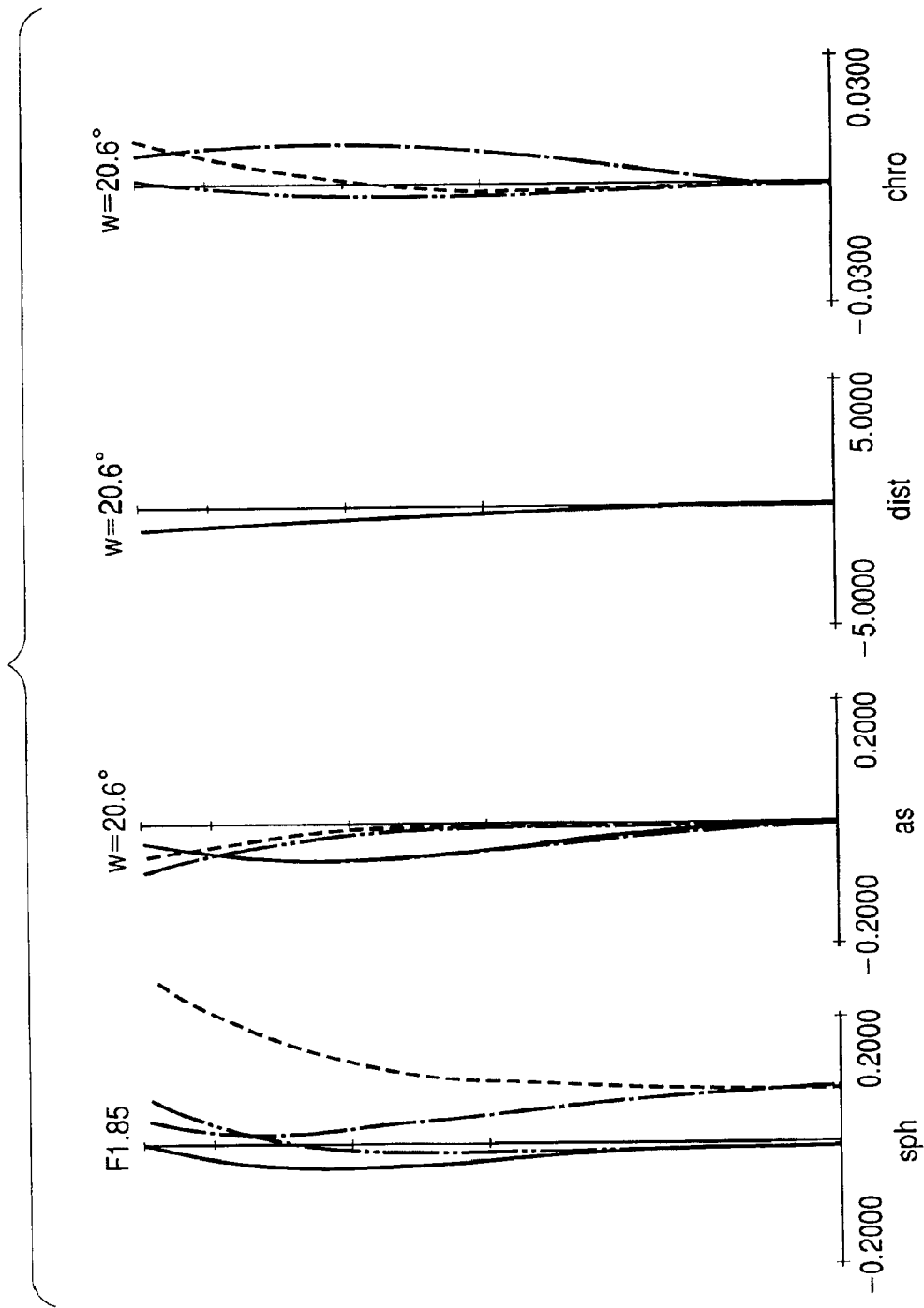
FIG. 23 is a view showing aberration curves at the intermediate position of the projection lens according to Example 5.
Figure 24:
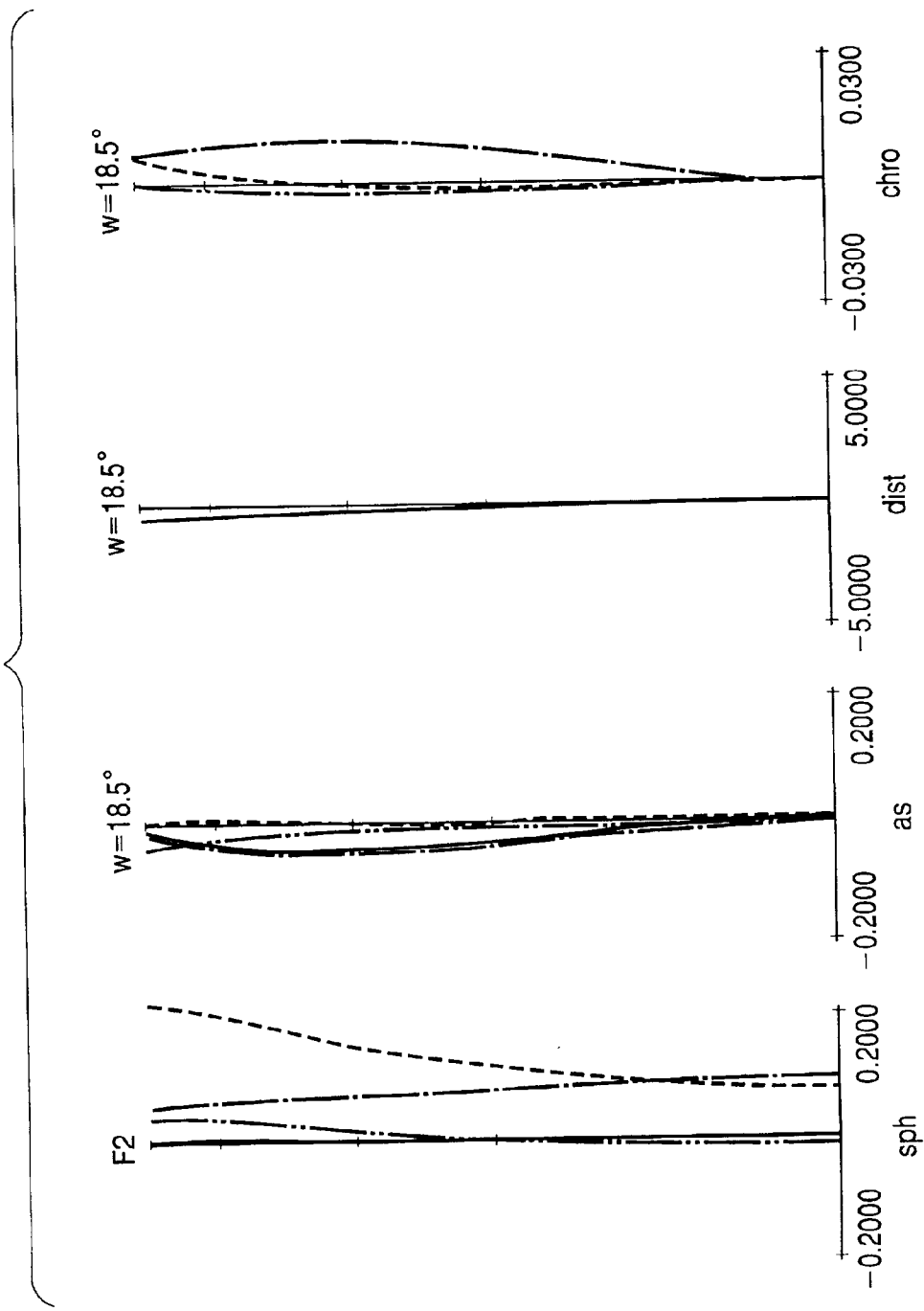
FIG. 24 is a view showing aberration curves at the maximum telephoto state position of the projection lens according to Example 5.

FIGS. 22 to 24 show aberration curves at the maximum wide-angle state position, intermediate position, and maximum telephoto state position of the projection lens according to Example 5.

The above described embodiments satisfy the following conditions (1) to (4).

| | |
|---|---|
| $0.07 < L/f < 0.35$ | (1) |
| $20° < \theta 1 < 35°$ | (2) |
| $40° < \theta 2 < 50°$ | (3) |
| $\|Lin/L\| > 4$ | (4) |

The significance of the above conditions (1) to (4) will be explained in below.

Conditional expression (1) limits the ratio between a diagonal length L of the image display portion of a liquid crystal panel and the focal length of the positive lens placed between the color combining prism CSP and the liquid crystal panel or formed on the incident surface of the color combining prism CSP. In a region below the lower limit value defined by conditional expression (1), the refractive power of the positive lens becomes excessively low, the effective aperture of the color combining prism increases on the exit side, resulting in an increase in size of the color combining prism.

In a region exceeding the upper limit value defined by conditional expression (1), the stop position of the projection lens is excessively shifted toward the color combining prism of the projection lens, and the number of lenses between the stop and the liquid crystal panel side decreases. This makes it difficult to design a projection optical system and keep good optical performance.

Conditional expression (1) is therefore preferably satisfied. More preferably, conditional expression (1A) is satisfied.

Conditional expression (2) limits an angle $\theta 1$ defined by the surface of the color combining prism on which the exit-side dichroic film is formed and the exist surface of the color combining prism. In a region below the lower limit value defined by conditional expression (2), the total reflection conditions on the total reflecting surface also serving as an exit surface cannot be satisfied, resulting in light leakage. In a region exceeding the upper limit value defined by conditional expression (2), an optical path interferes with the exit surface of the exit-side prism, resulting in an adverse effect.

Conditional expression (2) is therefore preferably satisfied. More preferably, conditional expression (2A) is satisfied.

Conditional expression (3) limits an angle $\theta 2$ defined by the exit surface of a color combining prism and the surface of the color combining prism on which the incident-side dichroic film is formed. In a region below the lower limit value defined by conditional expression (3), the incident surface of the prism interferes with the optical path, and the distance between liquid crystal panels increases, resulting in an increase in size of the color combining prism. In a region exceeding the upper limit value, two liquid crystal panels are located excessively close to each other and interfere with each other.

Conditional expression (3) is therefore preferably satisfied. More preferably, conditional expression (3A) is satisfied.

Conditional expression (4) limits the ratio between a diagonal length L of the image display portion of the liquid crystal panel and a distance Lin from the incident pupil of a whole image projection optical system including a projection lens, color combining prism, and a positive lens to the display portion of the liquid crystal panel. Assume that a liquid crystal panel is to be used as an image modulation means. In this case, in a region exceeding conditional expression (4), the telecentric property of the projection lens with respect to the liquid crystal panel deteriorates, resulting in contrast unevenness.

NUMERICAL EXAMPLES

The numerical examples of the projection lenses according to the respective examples will be described below. In this numerical example, let ri be the radius of curvature of the ith lens surface from the screen side, di be the distance between the ith lens surface and the (i+1)th lens surface, ni be the refractive index of the ith lens for a d line, and vi be the Abbe number of the ith lens.

TABLE 1

| $f = 28.72190$ | | $fno = 1: 1.7-2$ | | $2w = 47°-37°$ | |
|---|---|---|---|---|---|
| r1 = 236.890 | d1 = 3.63 | n1 = 1.51633 | v1 = 64.1 |
| r2 = −121.470 | d2 = 0.20 | | |
| r3 = 120.213 | d3 = 1.60 | n2 = 1.60311 | v2 = 60.6 |
| r4 = 29.385 | d4 = 7.50 | | |
| r5 = −41.923 | d5 = 1.35 | n3 = 1.51823 | v3 = 58.9 |
| r6 = 41.922 | d6 = 6.08 | | |
| r7 = 90.810 | d7 = 3.00 | n4 = 1.83400 | v4 = 37.2 |
| r8 = −194.970 | d8 = variable | | |
| r9 = 52.200 | d9 = 4.30 | n5 = 1.79952 | v5 = 42.2 |
| r10 = −67.500 | d10 = 0.79 | | |
| r11 = −42.972 | d11 = 1.10 | n6 = 1.84666 | v6 = 23.8 |

TABLE 1-continued f = 28.72190    fno = 1: 1.7–2    2w = 47°–37°

| | | | |
|---|---|---|---|
| r12 = −84.703 | d12 = variable | | |
| r13 = 40.775 | d13 = 5.61 | n7 = 1.69680 | v7 = 55.5 |
| r14 = −74.567 | d14 = variable | | |
| r15 = ∞ (aperture) | d15 = 4.30 | | |
| r16 = −78.041 | d16 = 0.95 | n8 = 1.51742 | v8 = 52.4 |
| r17 = 22.227 | d17 = variable | | |
| r18 = −17.501 | d18 = 1.20 | n9 = 1.80518 | v9 = 25.4 |
| r19 = 39.858 | d19 = 5.88 | n10 = 1.63854 | v10 = 55.4 |
| r20 = −23.920 | d20 = 0.20 | | |
| r21 = −76.258 | d21 = 2.87 | n11 = 1.83400 | v11 = 37.2 |
| r22 = −32.382 | d22 = variable | | |
| r23 = 55.523 | d23 = 4.30 | n12 = 1.80610 | v12 = 40.9 |
| r24 = −276.575 | d24 = 3.00 | | |
| r25 = ∞ | d25 = 35.00 | n13 = 1.62299 | v13 = 58.2 |
| r26 = ∞ | d26 = 0.20 | | |
| r27 = 91.626 | d27 = 2.00 | n14 = 1.83400 | v14 = 37.2 |
| r28 = ∞ | | | |

| Focal Length Variable Distance | 28.72 | 33.28 | 37.32 |
|---|---|---|---|
| d 8 | 13.05 | 5.98 | 0.65 |
| d12 | 6.49 | 6.51 | 6.83 |
| d14 | 1.28 | 1.87 | 2.56 |
| d17 | 5.75 | 6.08 | 5.85 |
| d22 | 0.50 | 6.62 | 11.17 |

TABLE 2 f = 28.73095    fno = 1: 1.7–2    2w = 47°–37°

| | | | |
|---|---|---|---|
| r1 = 194.071 | d1 = 4.44 | n1 = 1.51633 | v1 = 64.1 |
| r2 = −105.327 | d2 = 0.20 | | |
| r3 = 129.897 | d3 = 1.60 | n2 = 1.48749 | v2 = 70.2 |
| r4 = 29.079 | d4 = 8.17 | | |
| r5 = −38.113 | d5 = 1.35 | n3 = 1.51633 | v3 = 64.1 |
| r6 = 38.112 | d6 = 8.84 | | |
| r7 = 100.654 | d7 = 2.77 | n4 = 1.83400 | v4 = 37.2 |
| r8 = −249.951 | d8 = variable | | |
| r9 = 57.764 | d9 = 4.84 | n5 = 1.79952 | v5 = 42.2 |
| r10 = −49.110 | d10 = 0.40 | | |
| r11 = −41.778 | d11 = 1.10 | n6 = 1.84666 | v6 = 23.8 |
| r12 = −109.085 | d12 = variable | | |
| r13 = 35.219 | d13 = 6.48 | n7 = 1.69680 | v7 = 55.5 |
| r14 = −75.545 | d14 = variable | | |
| r15 = ∞ (aperture) | d15 = 3.04 | | |
| r16 = −62.942 | d16 = 0.95 | n8 = 1.51742 | v8 = 52.4 |
| r17 = 21.172 | d17 = variable | | |
| r18 = −18.322 | d18 = 1.20 | n9 = 1.74077 | v9 = 27.8 |
| r19 = 36.168 | d19 = 5.70 | n10 = 1.60311 | v10 = 60.6 |
| r20 = −23.922 | d20 = 0.20 | | |
| r21 = −73.979 | d21 = 2.55 | n11 = 1.83400 | v11 = 37.2 |
| r22 = −32.617 | d22 = variable | | |
| r23 = 52.999 | d23 = 3.68 | n12 = 1.78590 | v12 = 44.2 |
| r24 = 1634.404 | d24 = 2.50 | | |
| r25 = ∞ | d25 = 35.00 | n13 = 1.51633 | v13 = 64.1 |
| r26 = ∞ | d26 = 0.20 | | |
| r27 = 73.458 | d27 = 2.50 | n14 = 1.83400 | v14 = 37.2 |
| r28 = ∞ | | | |

| Focal Length Variable Distance | 28.73 | 33.32 | 37.32 |
|---|---|---|---|
| d 8 | 13.03 | 5.92 | 0.57 |
| d12 | 7.11 | 7.02 | 7.35 |
| d14 | 0.83 | 1.12 | 1.54 |
| d17 | 5.97 | 6.88 | 6.73 |
| d22 | 0.50 | 6.48 | 11.25 |

TABLE 3 f = 28.72041    fno = 1: 1.7–2    2w = 47°–37°

| | | | |
|---|---|---|---|
| r1 = 167.569 | d1 = 4.06 | n1 = 1.51633 | v1 = 64.1 |
| r2 = −125.839 | d2 = 0.20 | | |
| r3 = 91.825 | d3 = 1.60 | n2 = 1.51633 | v2 = 64.1 |
| r4 = 26.308 | d4 = 7.95 | | |
| r5 = −40.756 | d5 = 1.35 | n3 = 1.51633 | v3 = 64.1 |
| r6 = 40.755 | d6 = 7.38 | | |
| r7 = 87.606 | d7 = 2.62 | n4 = 1.83400 | v4 = 37.2 |
| r8 = −444.927 | d8 = variable | | |
| r9 = 61.367 | d9 = 3.90 | n5 = 1.80610 | v5 = 40.9 |
| r10 = −73.758 | d10 = 1.00 | | |
| r11 = −41.435 | d11 = 1.10 | n6 = 1.84666 | v6 = 23.8 |
| r12 = −83.791 | d12 = variable | | |
| r13 = 43.750 | d13 = 6.08 | n7 = 1.69680 | v7 = 55.5 |
| r14 = −79.634 | d14 = variable | | |
| r15 = ∞ (aperture) | d15 = 3.64 | | |
| r16 = −156.812 | d16 = 0.95 | n8 = 1.51742 | v8 = 52.4 |
| r17 = 23.088 | d17 = variable | | |
| r18 = −18.035 | d18 = 1.20 | n9 = 1.78472 | v9 = 25.7 |
| r19 = 37.206 | d19 = 6.23 | n10 = 1.65844 | v10 = 50.9 |
| r20 = −23.156 | d20 = 0.20 | | |
| r21 = −120.966 | d21 = 2.82 | n11 = 1.83400 | v11 = 37.2 |
| r22 = −40.070 | d22 = variable | | |
| r23 = 51.806 | d23 = 4.62 | n12 = 1.79952 | v12 = 42.2 |
| r24 = −3785.017 | d24 = 3.00 | | |
| r25 = ∞ | d25 = 35.00 | n13 = 1.51633 | v13 = 64.1 |
| r26 = ∞ | d26 = 0.20 | | |
| r27 = 91.420 | d27 = 2.00 | n14 = 1.83400 | v14 = 37.2 |
| r28 = ∞ | | | |

| Focal Length Variable Distance | 28.72 | 33.24 | 37.33 |
|---|---|---|---|
| d 8 | 12.36 | 5.73 | 0.73 |
| d12 | 2.13 | 1.56 | 1.25 |
| d14 | 4.04 | 4.78 | 5.66 |
| d17 | 6.03 | 6.52 | 6.29 |
| d22 | 0.50 | 6.47 | 11.12 |

The following are values associated with the conditional expressions for the projection lenses in association with the above numerical examples:

| | Conditional Expression (1) | Conditional Expression (4) |
|---|---|---|
| Numerical Example 1 | 0.162 | 11.665 |
| Numerical Example 2 | 0.202 | 11.555 |
| Numerical Example 3 | 0.162 | 11.675 |

The following are values associated with the conditional expressions for the color combining prisms:

|  | Conditional Expression (2) | Conditional Expression (3) |  |
|---|---|---|---|
| Example 1 | 28° | 45° | (FIG. 3) |
| Example 2 | 28° | 45° | (FIG. 4) |
| Example 3 | 28° | 45° | (FIG. 5) |
| Example 4 | 28° | 45° | (FIG. 6) |
| Example 5 | 28° | 45° | (FIG. 7) |

In each embodiment described above, a liquid crystal panel is used as an image modulation means. However, other image modulation means may be used.

In each embodiment described above, a color combining prism in which two dichroic films do not cross each other is used. However, the present invention can be applied to a so-called cross-dichroic prism.

According to the embodiments, examples, and numerical examples, the optical thickness of a dichroic film is increased or decreased from one end side to the other end side in an inclining direction with respect to the incident optical axis of chromatic light reflected by the dichroic film. Even if, therefore, the incident angle of a light beam on the dichroic film changes depending on the position on the dichroic film, the reflection characteristics at the respective positions on the film can be made uniform. This makes it possible to prevent brightness unevenness and color unevenness in a color-combined image.

An excellent color-combined image without any brightness/color unevenness and the like can be obtained with a compact arrangement.

What is claimed is:

1. An image display apparatus comprising:
   a first image modulation means;
   a second image modulation means;
   a color combining optical system which combines a light of a first wavelength area emitted from said first image modulation means and a light of a second wavelength area emitted from said second image modulation means;
   a first lens having positive power arranged between said first image modulation means and said color combining optical system; and
   a second lens having positive power arranged between said second image modulation means and said color combining optical system;
   said color combining optical system including:
      a color combining prism including a plurality of prisms cemented to one another; and
      a dichroic film which combines the light of said first wavelength area and the light of said second wavelength area by reflecting the light of said first wavelength area and transmitting the light of said second wavelength area;
   wherein an optical thickness of said dichroic film increases to other end from the end along slant direction to incident optical axis of the light of said first wavelength area, and
   wherein said dichroic film is formed on interfaces between two prisms in a plurality of prisms.

2. An apparatus according to claim 1, wherein a thickness of the dichroic film increases or decreases from one end side to the other end side in the inclining direction.

3. An apparatus according to claim 1, wherein a refractive index of the dichroic film increases or decreases from one end side to the other end side in the inclining direction.

4. An apparatus according to claim 1, wherein an optical thickness of said dichroic film increases as an incident angle of the light of said first wavelength area on the dichroic film increases.

5. An apparatus according to claim 1, wherein said first lens and said second lens are contacted to said color combining prism.

6. An apparatus according to claim 1, wherein said first lens and said second lens are integrally formed in said color combining prism.

7. An apparatus according to claim 1, wherein said color combining prism incorporates two dichroic films for reflecting different color light beams, and an optical thickness of at least one of the two dichroic films increases or decreases from one end side to the other end side in the inclining direction.

8. An apparatus according to claim 7, wherein the two dichroic films are formed so as not to cross each other within said color combining prism.

9. An apparatus according to claim 8, wherein said color combining prism comprises three prisms.

10. An apparatus according to claim 8, wherein said color combining prism comprises four prisms.

11. An apparatus according to claim 7, wherein said color combining prism comprises three prisms.

12. An apparatus according to claim 7, wherein said color combining prism comprises four prisms.

13. An apparatus according to claim 12, wherein two prisms are arranged between two dichroic films.

14. An apparatus according to claim 7, wherein an angle q1 defined by a surface of said color combining prism which is located on an exit side and on which a dichroic film is formed and an exit surface of said color combining prism satisfies $$20°<q1<35°$$

15. An apparatus according to claim 7, wherein an angle q2 defined by an exit surface of said color combining prism and a surface of said color combining prism which is located on an incident side and on which a dichroic film is formed satisfies $$40°<q2<50°$$

16. An apparatus according to claim 1, wherein said color combining prism includes a plurality of prisms, and
   a prism, of the plurality of prisms, which is located nearest to an exit side has at least three optically flat surfaces, and an exit surface also serves as a totally reflecting surface.

17. An apparatus according to claim 1, wherein said color combining prism sequentially includes, from an exit side,
   a first prism having at least three optically flat surfaces, with an exit surface also serving as a totally reflecting surface,
   a second prism having at least three optically smooth surfaces, and
   a third prism having at least two optically smooth surfaces, and
   two dichroic films which reflect different color light beams are arranged between said respective prisms so as not to cross each other.

18. An apparatus according to claim 1, wherein said color combining prism sequentially includes, from an exit side, a first prism having at least three optically flat surfaces, with an exit surface also serving as a totally reflecting surface, a second prism having at least two optically smooth surfaces, a third prism having at least three optically smooth surfaces, and a fourth prism having at least two optically smooth surfaces, two dichroic films which reflect different color light beams are arranged between said first and second prisms and between said third and fourth prisms so as not to cross each other.

19. An apparatus according to claim 1, wherein $0.07<L/f<0.35$ is satisfied, where L is a diagonal length of an image display portion of said image modulation means, and f is a focal length of said positive refracting optical element.

20. An apparatus according to claim 1, wherein a focal length of at least one of said plurality of positive refracting optical elements is different from focal lengths of said remaining positive refracting optical elements.

21. An apparatus according to claim 1, further comprising a projection optical system for enlarging/projecting combined image light from said color combining optical system.

22. An apparatus according to claim 21, wherein $|Lin/L|<4$ is satisfied, where Lin is a distance from an incident pupil of said entire overall image projection optical system including said projection optical system, said color combining prism, and said positive refracting optical element to a display portion of said image modulation means, and L is a diagonal length of the image display portion of said image modulation means.

23. An image display apparatus comprising:

a first image modulation means;

a second image modulation means;

a color combining optical system which combines a light of a first wavelength area emitted from said first image modulation means and a light of a second wavelength area emitted from said second image modulation means;

a first lens having positive power arranged between said first image modulation means and said color combining optical system; and a second lens having positive power arranged between said second image modulation means and said color combining optical system;

said color combining optical system including:

a plurality of prisms cemented to one another; and a color combining film which combines the light of said first wavelength area and the light of said second wavelength area by reflecting the light of said first wavelength area and transmitting the light of said second wavelength area;

wherein an optical characteristic of said color combining film changes to other end from the end along slant direction to incident optical axis of the light of said first wavelength area and wherein said color combining film is formed on interfaces between two prisms in a plurality of prisms.

24. An apparatus according to claim 23, wherein an optical thickness of said color combining film increases to other end from the end along slant direction to incident optica axis of the light of said first wavelength area.

\* \* \* \* \*